US011873768B1

(12) United States Patent
Dindar et al.

(10) Patent No.: US 11,873,768 B1
(45) Date of Patent: Jan. 16, 2024

(54) HYDROGEN FUEL SYSTEM FOR A GAS TURBINE ENGINE

(71) Applicant: General Electric Company, Schenectady, NY (US)

(72) Inventors: Mustafa Dindar, West Chester, OH (US); Scott Alan Schimmels, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/946,766

(22) Filed: Sep. 16, 2022

(51) Int. Cl.
*F02C 9/40* (2006.01)
*F02C 3/22* (2006.01)
*F02C 7/224* (2006.01)
*F02C 9/28* (2006.01)

(52) U.S. Cl.
CPC ............... *F02C 9/40* (2013.01); *F02C 3/22* (2013.01); *F02C 7/224* (2013.01); *F02C 9/28* (2013.01); *F05D 2210/132* (2013.01); *F05D 2220/32* (2013.01); *F05D 2270/80* (2013.01)

(58) Field of Classification Search
CPC ..................................... F02C 9/40; F02C 3/22
See application file for complete search history.

(56) References Cited

U.S. PATENT DOCUMENTS

| | | |
|---|---|---|
| 2,956,402 A | 10/1960 | Rae |
| 2,984,978 A | 5/1961 | Griffith |
| 3,261,571 A | 7/1966 | Pinnes |
| 3,768,254 A | 10/1973 | Stuart |
| 4,505,124 A | 3/1985 | Mayer |
| 4,705,100 A | 11/1987 | Black et al. |
| 4,714,139 A | 12/1987 | Lorenz et al. |
| 4,776,536 A | 10/1988 | Hudson et al. |
| 6,182,435 B1 | 2/2001 | Niggemann et al. |
| 6,415,595 B1 | 7/2002 | Wilmot, Jr. et al. |
| 6,939,392 B2 | 9/2005 | Huang et al. |
| 7,055,505 B2 | 6/2006 | Washeleski et al. |
| 7,260,926 B2 | 8/2007 | Sabatino et al. |
| 7,459,081 B2 | 12/2008 | Koenig et al. |
| 7,523,603 B2 | 4/2009 | Hagen et al. |
| 7,546,834 B1 * | 6/2009 | Ulrey .................. F02D 19/0692 123/576 |
| 7,555,893 B2 | 7/2009 | Okai et al. |
| 7,654,232 B2 | 2/2010 | Ishimaru et al. |
| 7,694,916 B2 | 4/2010 | Limaye et al. |
| 7,806,365 B2 | 10/2010 | Miller et al. |

(Continued)

FOREIGN PATENT DOCUMENTS

| | | |
|---|---|---|
| CN | 113184196 A | 7/2021 |
| CN | 113864052 A | 12/2021 |
| WO | WO202228652 A1 | 2/2022 |

*Primary Examiner* — Long T Tran
(74) *Attorney, Agent, or Firm* — Dority & Manning, P.A.

(57) ABSTRACT

A method of operating a fuel management unit for a fuel system. The method including: receiving data indicative of a state of an exhaust assembly using a sensor of the fuel system, the state of the exhaust assembly including a temperature of a working gas flow within the exhaust assembly; determining an amount of a hydrogen fuel in a liquid phase to provide to a hydrogen delivery assembly in response to receiving data indicative of the state of the exhaust assembly; and directing one or more components to provide the determined amount of the hydrogen fuel to the hydrogen delivery assembly.

20 Claims, 10 Drawing Sheets

(56) References Cited

U.S. PATENT DOCUMENTS

| | | |
|---|---|---|
| 7,971,438 B2 | 7/2011 | Taylor et al. |
| 7,984,606 B2 | 7/2011 | Smith |
| 8,042,343 B2 | 10/2011 | Jarlestal |
| 8,132,398 B2 | 3/2012 | Wang et al. |
| 8,499,822 B2 | 8/2013 | Bulin et al. |
| 8,522,572 B2 | 9/2013 | Coffinberry et al. |
| 8,677,755 B2 | 3/2014 | Bulin et al. |
| 8,955,302 B2 | 2/2015 | Van Straaten et al. |
| 9,038,397 B2 | 5/2015 | Papa et al. |
| 9,074,562 B2 | 7/2015 | Tsutsumi et al. |
| 9,151,180 B2 | 10/2015 | Veilleux, Jr. |
| 9,334,802 B2 | 5/2016 | Papa et al. |
| 9,561,857 B2 | 2/2017 | Weber |
| 9,604,730 B2 | 3/2017 | Hagh et al. |
| 9,687,773 B2 | 6/2017 | Johnson et al. |
| 9,724,625 B2 | 8/2017 | Lo |
| 9,731,834 B2 | 8/2017 | Hagh et al. |
| 9,823,030 B2 | 11/2017 | Veilleux, Jr. |
| 9,834,315 B2 | 12/2017 | Lo et al. |
| 9,863,322 B2 | 1/2018 | Williams et al. |
| 10,086,222 B2 | 10/2018 | Tichborne et al. |
| 10,260,419 B2 | 4/2019 | Cerny et al. |
| 10,352,241 B2 | 7/2019 | Snape et al. |
| 10,364,750 B2 | 7/2019 | Rambo |
| 10,487,714 B2 | 11/2019 | Uhrich et al. |
| 10,526,971 B2 | 1/2020 | Mastrocola et al. |
| 10,801,410 B2 | 10/2020 | Roberge |
| 10,914,274 B1 | 2/2021 | O'Connor et al. |
| 10,941,706 B2 | 3/2021 | Sen et al. |
| 11,015,534 B2 | 5/2021 | Smith et al. |
| 11,085,636 B2 | 8/2021 | O'Connor et al. |
| 11,125,165 B2 | 9/2021 | Niergarth et al. |
| 11,131,256 B2 | 9/2021 | O'Connor et al. |
| 11,143,104 B2 | 10/2021 | Pal et al. |
| 11,161,622 B2 | 11/2021 | Andrews, Jr. et al. |
| 11,162,379 B2 | 11/2021 | Spierling |
| 11,186,382 B2 | 11/2021 | Andrews, Jr. et al. |
| 11,187,156 B2 | 11/2021 | Niergarth et al. |
| 2006/0204799 A1* | 9/2006 | Ishikawa ............... C01B 3/501 429/444 |
| 2007/0101731 A1 | 5/2007 | Bayt et al. |
| 2011/0262309 A1 | 10/2011 | Limaye et al. |
| 2012/0186560 A1* | 7/2012 | Lund .................. F02D 19/0684 123/495 |
| 2012/0216677 A1 | 8/2012 | Koenig et al. |
| 2012/0297780 A1 | 11/2012 | Bruno et al. |
| 2014/0250908 A1* | 9/2014 | Huntington ............ F01K 13/02 60/776 |
| 2015/0323189 A1* | 11/2015 | Jeney .................... F23D 17/002 60/39.463 |
| 2017/0058774 A1 | 3/2017 | Pickford |
| 2017/0167307 A1 | 6/2017 | Scipio et al. |
| 2017/0217592 A1 | 8/2017 | Hinderliter |
| 2019/0218971 A1 | 7/2019 | Niergarth et al. |
| 2019/0383564 A1 | 12/2019 | Miller et al. |
| 2020/0088098 A1* | 3/2020 | Roberge ................ F02C 7/16 |
| 2020/0088099 A1* | 3/2020 | Roberge ................ F02C 7/224 |
| 2020/0088102 A1* | 3/2020 | Roberge ................ F02C 7/224 |
| 2020/0140109 A1 | 5/2020 | O'Connor et al. |
| 2020/0140110 A1 | 5/2020 | O'Connor et al. |
| 2020/0140113 A1 | 5/2020 | Niergarth et al. |
| 2020/0141575 A1 | 5/2020 | O'Connor et al. |
| 2020/0165974 A1 | 5/2020 | Smith et al. |
| 2021/0148283 A1 | 5/2021 | Niergarth et al. |
| 2021/0300575 A1 | 9/2021 | Staubach et al. |
| 2021/0339878 A1 | 11/2021 | Niergarth et al. |
| 2021/0340913 A1 | 11/2021 | Andrews, Jr. et al. |
| 2021/0340936 A1 | 11/2021 | O'Connor et al. |
| 2021/0348561 A1 | 11/2021 | Cocks et al. |
| 2022/0099299 A1* | 3/2022 | Carrotte ................ F02C 7/143 |
| 2023/0045911 A1* | 2/2023 | Smith .................... F02C 7/36 |
| 2023/0094065 A1* | 3/2023 | Yoshida ................ F02C 9/40 60/734 |

\* cited by examiner

HYDROGEN FUEL SYSTEM FOR A GAS TURBINE ENGINE

FIELD

The present disclosure generally relates to a hydrogen fuel system for a gas turbine engine.

BACKGROUND

A gas turbine engine generally includes a fan and a turbomachine arranged in flow communication with one another. Additionally, the turbomachine of the gas turbine engine includes, in serial flow order, a compressor section, a combustion section, a turbine section, and an exhaust section. In operation, air is provided from the fan to an inlet of the compressor section where one or more axial compressors progressively compress the air until it reaches the combustion section to provide a working gas flow. The working gas flow are routed from the combustion section to the turbine section. The flow of combustion gasses through the turbine section drives the turbine section and is then routed through the exhaust section, e.g., to the atmosphere. With at least certain gas turbine engines, the gas turbine engine may be configured to combust hydrogen fuel.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
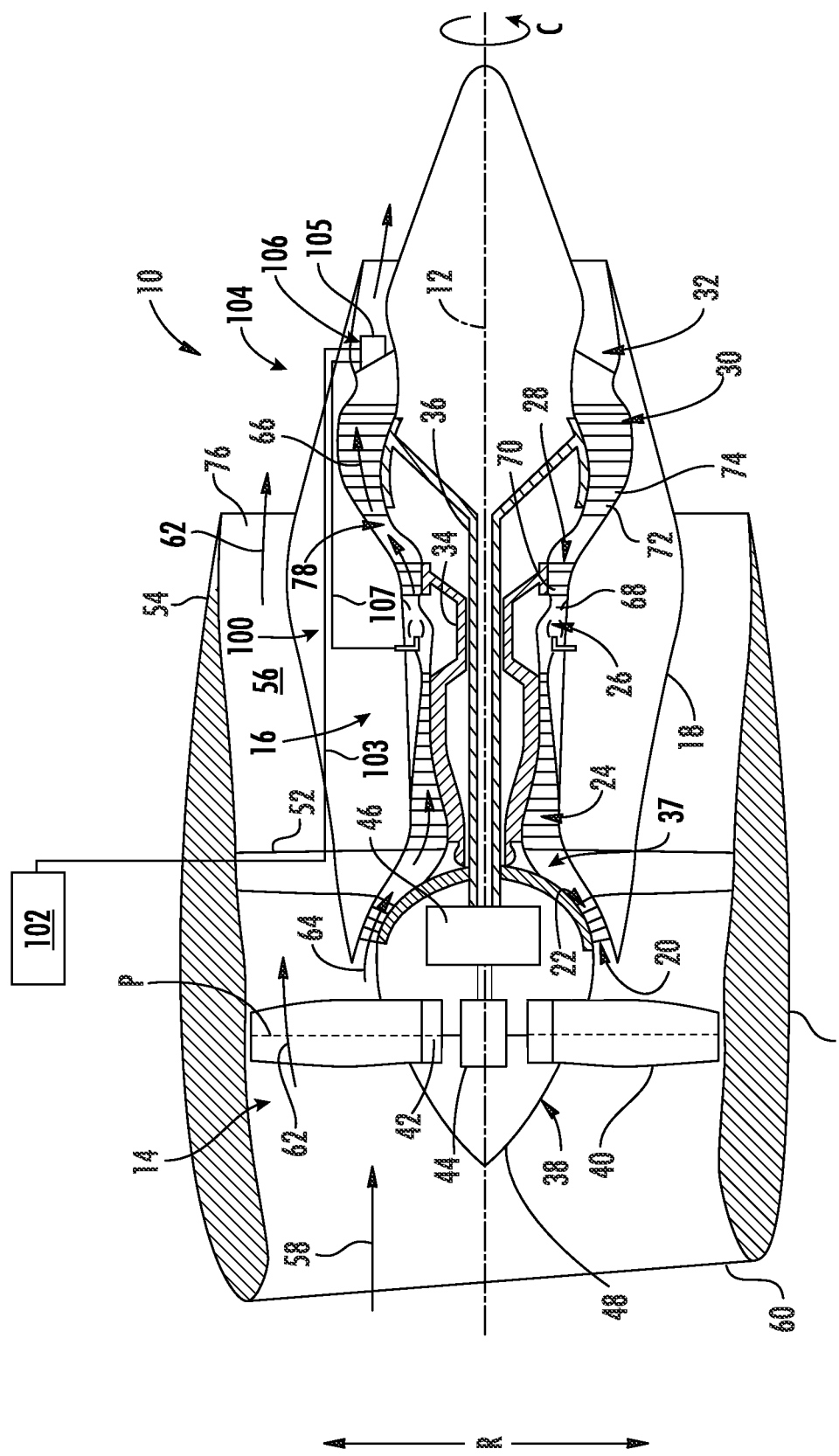
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the term "integral" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Aspects of the present disclosure present a fuel system for a gas turbine including an exhaust assembly. The exhaust assembly defines a radial direction, a circumferential direction, an axial direction and includes a tail cone, a nacelle defining a bypass airflow passage, and a core nozzle circumferentially surrounding at least a portion of the tail cone and defining a hot gas flow path with the tail cone. The fuel system includes a hydrogen fuel tank for holding a hydrogen fuel and a hydrogen delivery assembly in thermal communication with the exhaust assembly and in flow communication with the hydrogen fuel tank. More particularly, the hydrogen delivery assembly includes an inlet in fluid communication with the hydrogen fuel tank, an outlet in fluid communication with a combustion section of the gas turbine engine, and a heat exchanger tubing positioned within the exhaust assembly downstream of the inlet and upstream of the outlet. Such a configuration provides a lower exhaust pressure loss, a lower impact to the thrust of the gas turbine engine, a lower risk of operability impact to the turbomachine, and larger heat exchanger surface area.

Further aspects of the present disclosure present a fuel system in accordance with another exemplary aspect of the present disclosure. The fuel system includes a heat exchanger that is configured to be coupled to or integrated into a tail cone of the exhaust assembly. The heat exchanger includes a first axial flow path in flow communication with the hydrogen fuel tank, a second axial flow path in flow communication with the combustion section of the gas turbine engine, and a radial flow path. Such a configuration provides a reduction in backpressure to the turbomachine and provides less blockage to the hot gas flow path.

Moreover, aspects of the present disclosure present a method of operating a fuel system of a gas turbine engine. A fuel management unit is used to determine the temperature of the working gas flow of the exhaust assembly. A flow of a hydrogen fuel in a liquid phase is generated into the hydrogen delivery assembly, the heat exchanger, or a combination thereof. The hydrogen fuel in the liquid phase is heated to change a phase of the hydrogen fuel and delivered to a combustion section of the gas turbine engine.

Benefits of the disclosed fuel system and method of operating include lower exhaust pressure losses, lower risk of operability impact to the turbomachinery, and a larger heat exchanger surface area availability.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22.

The compressor section, combustion section 26, turbine section, and jet exhaust nozzle section 32 together define a working gas flow path 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flow path 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide a working gas flow 66.

The working gas flow 66 are routed through the HP turbine 28 where a portion of thermal and/or kinetic energy from the working gas flow 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The working gas flow 66 are then routed through the LP turbine 30 where a second portion of thermal and kinetic energy is extracted from the working gas flow 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The working gas flow 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas flow path 78 for routing the working gas flow 66 through the turbomachine 16.

As further shown in FIG. 1, the gas turbine engine 10 includes a fuel system 100 for delivery of a hydrogen fuel to the combustion section 26 for combustion. In this regard, a power source for the gas turbine engine 10 of FIG. 1 is the hydrogen fuel. The fuel system 100 includes one or more hydrogen fuel tanks 102 for holding the hydrogen fuel in a liquid phase and a hydrogen delivery assembly 104 in thermal communication with an exhaust assembly 106 of the jet exhaust nozzle section 32. The exhaust assembly 106 includes structure for directing exhaust gasses through the jet exhaust nozzle section 32, from the jet exhaust nozzle section 32, or both and is configured to provide heat to the hydrogen delivery assembly 104 to change the phase of the hydrogen fuel (discussed in more detail below).

The hydrogen delivery assembly 104 generally includes a liquid hydrogen line 103, a heat exchanger 105, and a gaseous hydrogen line 107. The liquid hydrogen line 103 in fluid communication with the hydrogen fuel tank 102, and more specifically extends from the one or more hydrogen fuel tanks 102 to the heat exchanger 105. The gaseous hydrogen line 107 in fluid communication with the combustion section 26 of the gas turbine engine 10, and more specifically extends from the heat exchanger 105 to the combustion section 26. The heat exchanger 105 and is positioned within the exhaust assembly 106 downstream of the liquid hydrogen line 103 and upstream of the gaseous hydrogen line 107.

Hydrogen fuel can be stored in a liquid state in the one or more hydrogen fuel tanks 102 at low temperatures, such as at negative two hundred fifty degrees Celsius (−250° C.). To achieve better fuel efficiency, the hydrogen delivery assembly 104 may include or be configured as one or more heat exchangers to pre-heat the hydrogen fuel so that the hydrogen fuel delivered to the combustion section 26 is, or is within a predetermined range of, a predetermined pre-combustion temperature.

Figure 2:
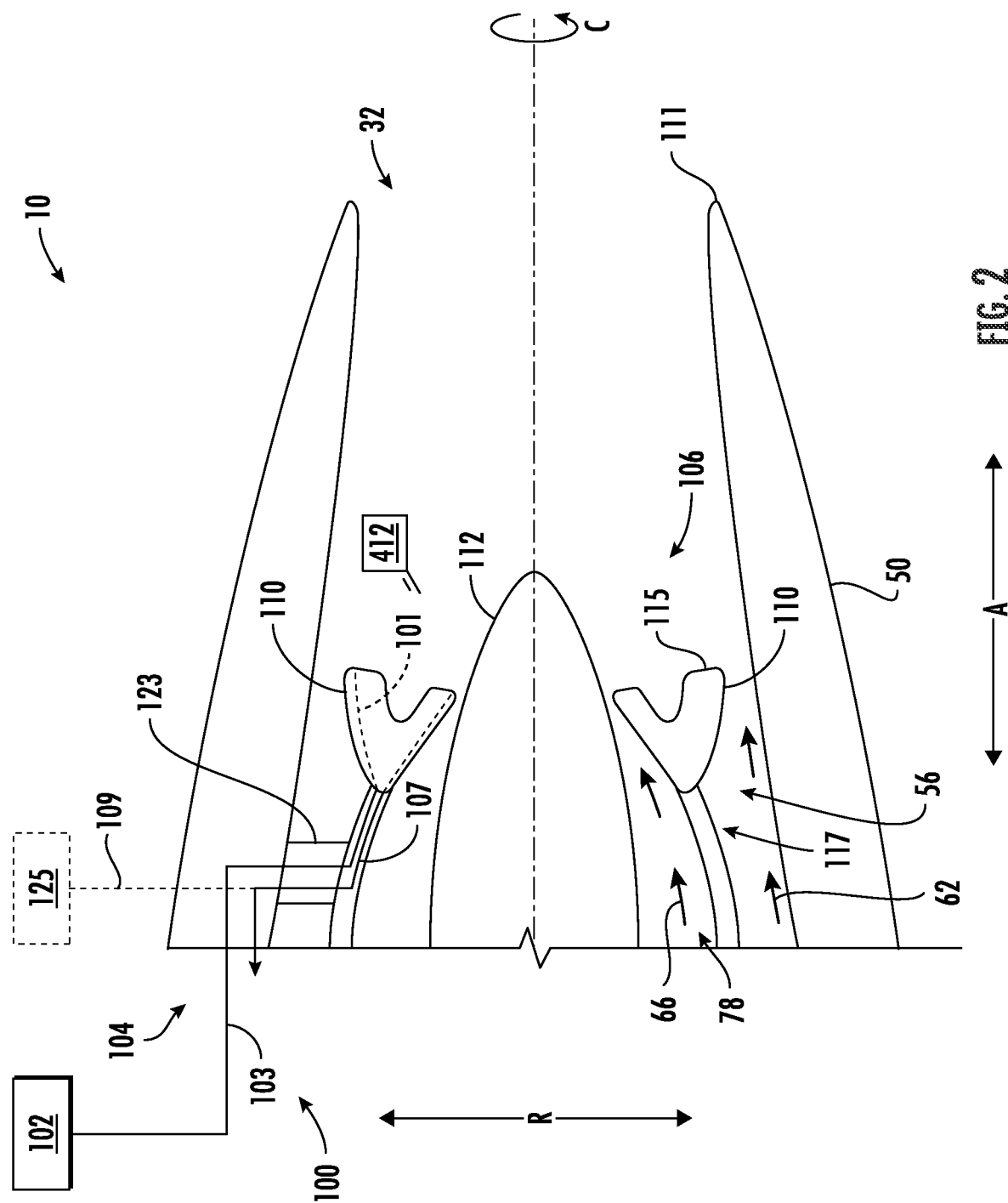
FIG. 2 is a cross-sectional view of an exhaust assembly of a gas turbine engine in accordance with an exemplary aspect of the present disclosure.

Referring now to FIG. 2, a cross-sectional view of a gas turbine engine 10 having an exhaust assembly 106 in accordance with an exemplary aspect of the present disclosure is provided. The exemplary gas turbine engine 10 of FIG. 2 may be configured in substantially the same manner as the exemplary gas turbine engine 10 of FIG. 1, and accordingly, the same or similar numbers may refer to the same or similar parts. However, the exhaust assembly 106 of FIG. 2 is configured as a long-duct mixed flow exhaust assembly 106.

As depicted in FIG. 2, the long-duct mixed flow exhaust assembly 106 includes a nacelle 50 defining a fan exit aperture 111 at a terminating end, a tail cone 112, and a core nozzle 117 defining a core exit aperture 115 at a terminating end. Additionally, the core nozzle 117 circumferentially surrounding at least a portion of the tail cone 112. Moreover, the long-duct mixed flow exhaust assembly 106 is configured so that fan exit aperture 111 is located downstream of the core exit aperture 115.

It should be appreciated that the nacelle 50 of FIG. 2 may be configured in a substantially the same manner as the nacelle 50 of FIG. 1. For example, the nacelle 50 of FIG. 2 defines a bypass airflow passage 56 having a first portion of air 62, or as used herein "bypass airflow 62," extending therethrough. However, in the exemplary embodiment depicted the nacelle 50 extends over the entirety of a turbomachine 16 (only a portion of which depicted for clarity).

Additionally, it should be appreciated that the core nozzle 117 of FIG. 2 may be configured as a downstream portion of an outer casing 18 surrounding the turbomachine 16, similar to the outer casing 18 of FIG. 1. For example, the core nozzle 117 defines a hot gas flow path 78 for routing a combustion gas 66, or as used herein a "working gas flow 66," through the turbomachine 16, and more particularly, through the core exit aperture 115. However, in the exemplary embodiment depicted, the core nozzle 117 includes a plurality of lobes 110 that radially extend into the bypass airflow passage 56 and define the core exit aperture 115. The plurality of lobes 110 are shaped to mix the bypass airflow 62 with the working gas flow 66. Such mixing of the bypass air flow 62 and the working gas flow 66 may result in increased thrust generated by the gas turbine engine 10.

Additionally, FIG. 2 shows a fuel system 100 that may be configured in substantially the same manner as the exemplary fuel system 100 of FIG. 1, and accordingly, the same or similar numbers may refer to the same or similar parts.

For example, the exemplary fuel system 100 of FIG. 2 generally includes one or more hydrogen fuel tanks 102 for holding hydrogen fuel in a liquid phase and a hydrogen delivery assembly 104 in thermal communication with the long-duct mixed flow exhaust assembly 106. The hydrogen delivery assembly 104 generally includes a liquid hydrogen line 103, a heat exchanger 105, and a gaseous hydrogen line 107. However, for the embodiment of FIG. 2, the heat exchanger 105 includes a heat exchanger tubing 101 (depicted in phantom). The heat exchanger tubing 101 is positioned within the plurality of lobes 110 and is configured to have the hydrogen fuel flowing therethrough.

The exemplary long-duct mixed flow exhaust assembly 106 additionally includes a strut 123 that is used to route the liquid hydrogen line 103 from the one or more hydrogen fuel tanks 102 to the heat exchanger tubing 101. The strut 123 may be any suitable strut extending through the bypass passage 56. For example, in at least certain exemplary aspects, the strut 123 may be one of the plurality of outlet guide vanes 52 depicted in FIG. 1.

Additionally, or alternatively, the strut 123 is used in the embodiment depicted to route the gaseous hydrogen line 107 from the heat exchanger tubing 101 to a combustion section (e.g., the combustion section 26 of FIG. 1). With such a configuration, the strut may be a dedicated strut for the long-duct mixed flow exhaust assembly 106, and the gaseous hydrogen line 107 may later be extended through, e.g., one of the plurality of outlet guide vanes 52 depicted in FIG. 1 to provide the fuel flow therethrough to the combustion section 26 (see FIG. 1).

Additionally, or alternatively, still, the gaseous hydrogen line 107 may not extend through the strut 123, and instead may extend within the outer casing 18 directly to the combustion section 26 (see FIG. 1).

As described above, the working gas flow 66 is in thermal communication with the plurality of lobes 110. In such a manner, the working gas flow heats the plurality of lobes 110 during an operating condition. The heat exchanger tubing 101 positioned within the plurality of lobes 110 is in thermal communication with the plurality of lobes and is configured to transfer heat from the plurality of lobes 110 to the hydrogen fuel within the heat exchanger tubing 101 to change the phase of the hydrogen fuel. More particularly, the heat exchanger tubing 101 may change the phase of the hydrogen fuel from the liquid phase to a gaseous phase. Additionally, the heat exchanger tubing 101 is configured to direct or route the hydrogen fuel to the combustion section through the gaseous hydrogen line 107.

It should be appreciated that the fuel system may include an auxiliary hydrogen fuel tank 125 (depicted in phantom) for holding an auxiliary hydrogen fuel in a gaseous phase. The auxiliary hydrogen fuel may be used to supplement the hydrogen fuel directed or routed into the combustion section and is routed through an auxiliary hydrogen line 109 (depicted in phantom) to gaseous hydrogen line 107.

Additionally, or alternatively, during an operating condition the auxiliary hydrogen fuel tank 125 may be used to accumulate excess hydrogen fuel in the gaseous phase that is not needed for combustion in the combustion section from the gaseous hydrogen line 107 through the auxiliary hydrogen line 109.

Further, the long-duct mixed flow exhaust assembly 106 includes a sensor 412 (described in more detail below) configured to receive data indicative of a state of the long-duct mixed flow exhaust assembly 106, e.g., the temperature of the working gas flow 66.

It should be appreciated that the exemplary long-duct mixed flow exhaust assembly 106 is provided by way of example only, and in alternative exemplary embodiments the exhaust assembly 106 may be any suitable exhaust assembly 106. For example, the exhaust assembly may include separate ducts that define the hot gas flow path, and the bypass airflow passage (e.g., see the fan nozzle exhaust section 76 and the jet exhaust nozzle section 32 of FIG. 1) such that the exhaust assembly is formed as a separate duct separate flow exhaust assembly.

Figure 3:
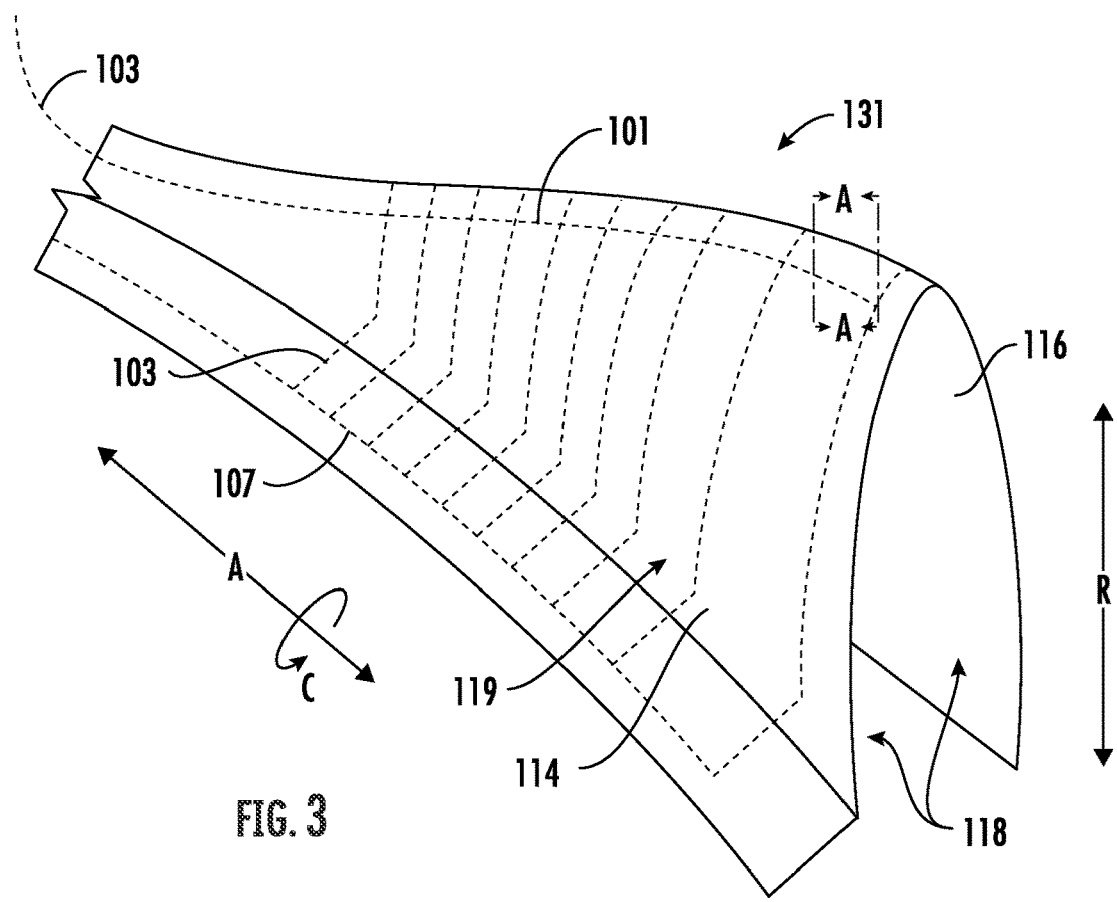
FIG. 3 is a schematic view of a lobe of a core nozzle in accordance with an exemplary aspect of the present disclosure.
Figure 4:
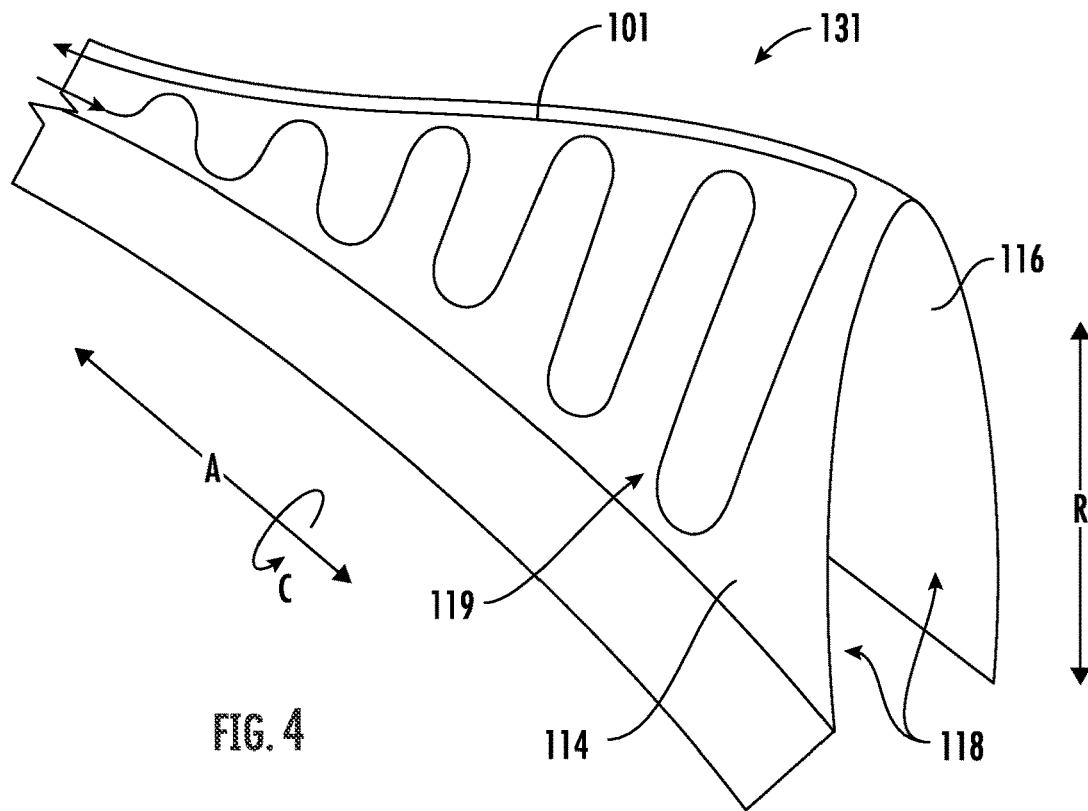
FIG. 4 is a schematic view of a lobe of a core nozzle in accordance with another exemplary aspect of the present disclosure.

Referring now briefly to FIGS. 3 and 4, schematic views of a lobe 131 in accordance with exemplary aspects of the present disclosure are provided. It should be appreciated that the lobe 131 of FIGS. 3 and 4 may be incorporated into the exhaust assembly 106 of FIG. 2. More particularly, the lobe 131 may be incorporated into the core nozzle 117 as a lobe of the plurality of lobes 110 (see FIG. 2). The lobe 131 defines a radial direction R, an axial direction A, and a circumferential direction C extending about the axial direction A. The radial, axial, and circumferential directions R, A, C of the lobe 131 may align with the radial, axial, and circumferential directions R, A, C, respectively, of the gas turbine engine within which it is installed (see, e.g., FIGS. 1 and 2).

The exemplary lobe 131 includes a first wall 114 and a second wall 116 and defines an inner surface 118 along a radial direction R that is exposed to hot gas flow path 78, and an outer surface 119 along the radial direction R that is exposed to bypass air flow passage 62. The first wall 114 and the second wall 116 together form a U-shape. The lobe 131 has a heat exchanger tubing 101 positioned between the inner surface 118 and the outer surface 119.

It should be appreciated that the heat exchanger tubing 101 may be positioned on or integrated into the first wall 114, positioned on or integrated into the second wall 116, or a combination thereof.

In particular, referring now particularly to the embodiment of FIG. 3, the heat exchanger tubing 101 positioned within the lobe 131 extends circumferentially around the first wall 114 and the second wall 116. More specifically (as depicted in phantom), the heat exchanger tubing 101 is in fluid communication with a liquid hydrogen line 103 for receiving hydrogen fuel in the liquid phase. The heat exchanger tubing 101 extends through the lobe 131 generally along a circumferential direction (e.g., along the radial direction R along the first wall 114, circumferentially to or from the second wall 116, and along the radial direction R along the second wall 116). Additionally, the heat exchanger tubing 101 is in fluid communication with a gaseous hydrogen line 107 for providing hydrogen fuel in a gaseous phase to a combustion section.

Additionally, it should be appreciated that the heat exchanger tubing 101 may further extend to adjacent lobes 131 (e.g., the plurality of lobes 110 of FIG. 2) that may be positioned circumferentially around the exhaust assembly 106, such as lobes 110 of FIG. 1. The heat exchanger tubing 101 may extend completely around the exhaust assembly 106 in a spiral manner along a length of the adjacent lobes 131 of the exhaust assembly.

Alternatively, as is depicted in phantom, the liquid hydrogen line 103 may extend to fluidly isolated sections of the heat exchanger tubing 101. The fluidly isolated section may be spaced along the axial direction A and may be arranged in parallel flow with the other fluidly isolated sections of the heat exchanger tubing 101, and may be directly in fluid communication with the liquid hydrogen line 103 and the gaseous hydrogen line 107, as shown in phantom.

It will be appreciated, however, that in other exemplary embodiments, the heat exchanger tubing 101 may not extend completely in the circumferential direction C through lobes 110. For example, referring now to FIG. 4, the heat exchanger tubing 101 is located in a single lobe 131. More specifically, the heat exchanger tubing 101 of FIG. 4 is integrated into the first wall 114 of the lobe 131. In particular, the heat exchanger tubing 101 extends along a height of the first wall 114 along the radial direction R and along a length of the first wall 114 along the axial direction A. The heat exchanger tubing 101 depicted is fluidly coupled to the liquid hydrogen line 103 and the gaseous hydrogen line 107. More specifically, the heat exchanger tubing 101 is in fluid communication with the liquid hydrogen line 103 for receiving hydrogen fuel in the liquid phase and is in fluid communication with the gaseous hydrogen line 107 for providing hydrogen fuel in a gaseous phase to a combustion section of the gas turbine engine (see combustion section 26 of FIG. 1).

Figure 5:
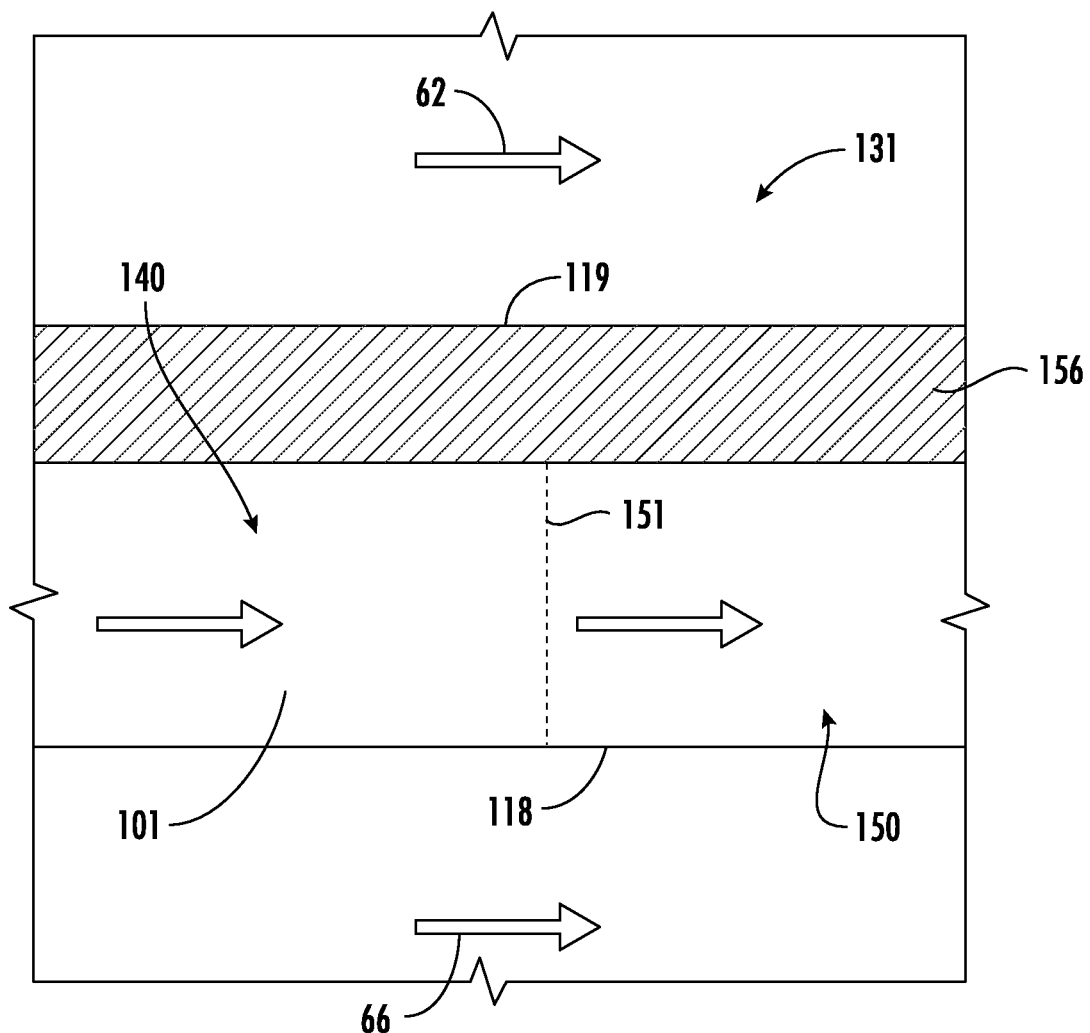
FIG. 5 is a cross-sectional view of the lobe of FIG. 3 taken along line A-A in accordance with the exemplary aspect of the present disclosure.

Referring now to FIG. 5, a cross-sectional view of the lobe 131 of the exhaust assembly 106, taken along line A-A in FIG. 3 is provided. As discussed above, the outer surface 119 of the lobe 131 is exposed to the bypass airflow 62. Additionally, as discussed above, the inner surface 118 of lobe 110 is exposed to the working gas flow 66.

During an operating condition, the heat exchanger tubing 101 is provided with hydrogen fuel in a liquid phase through the liquid hydrogen line 103. The heat exchanger tubing 101 converts the hydrogen fuel from a liquid phase to a gaseous phase. The hydrogen fuel is in the liquid phase in a liquid portion 140 of the heat exchanger tubing 101 and the hydrogen fuel is in the gaseous phase in a gaseous portion 150 of the heat exchanger tubing 101. Additionally, the liquid portion 140 is positioned upstream of the gaseous portion 150, such that the liquid portion 140 is proximate the liquid hydrogen line 103 and the gaseous portion 150 is proximate the gaseous hydrogen line 107.

The liquid portion 140 and the gaseous portion 150 are separated by phase line 151.

It should be appreciated that the position of the phase line 151 is provided by way of example only. In alternative exemplary embodiments phase line 151 may be positioned in any suitable location where the hydrogen fuel changes phase from a liquid phase to a gaseous phase. Further, it will be appreciated that the phase line 151 may move based on, e.g., an operating condition of the gas turbine engine, ambient conditions, etc. Further, still, although the phase line 151 is depicted as a single location, the phase line 151 may more specifically be a phase region of the heat exchanger tubing 101 where the fuel is transitioning from the liquid phase to the gaseous phase over a length of the heat exchanger tubing 101.

Additionally, in the exemplary embodiment depicted, the lobe 131 further includes thermal insulation 156 positioned between the outer surface 119 and the heat exchanger tubing 101. The thermal insulation 156 is configured to insulate the heat exchanger tubing 101 such that the heat exchanger tubing 101 is insulated from the outer surface 119. It should be appreciated that the thermal insulation 156 may be any suitable material. For example, the thermal insulation 156 may be a different material than the outer surface 119 and the thermal insulation 156 and may define a higher coefficient of thermal transfer than the material of the outer surface 119. In such a manner, more of the heat from the working gas flow 66 may be absorbed by the fuel through the heat exchanger tubing 101, and not transferred through the lobe 131 to the first portion of air 62 through the bypass passage 56 (see FIG. 3).

Moreover, it should be appreciated that the heat exchanger tubing 101 may be coupled to or formed integrally with the inner surface 118. For example, inner surface 118 and the heat exchanger tubing 101 may be formed together using an additive manufacturing method.

Figure 6:
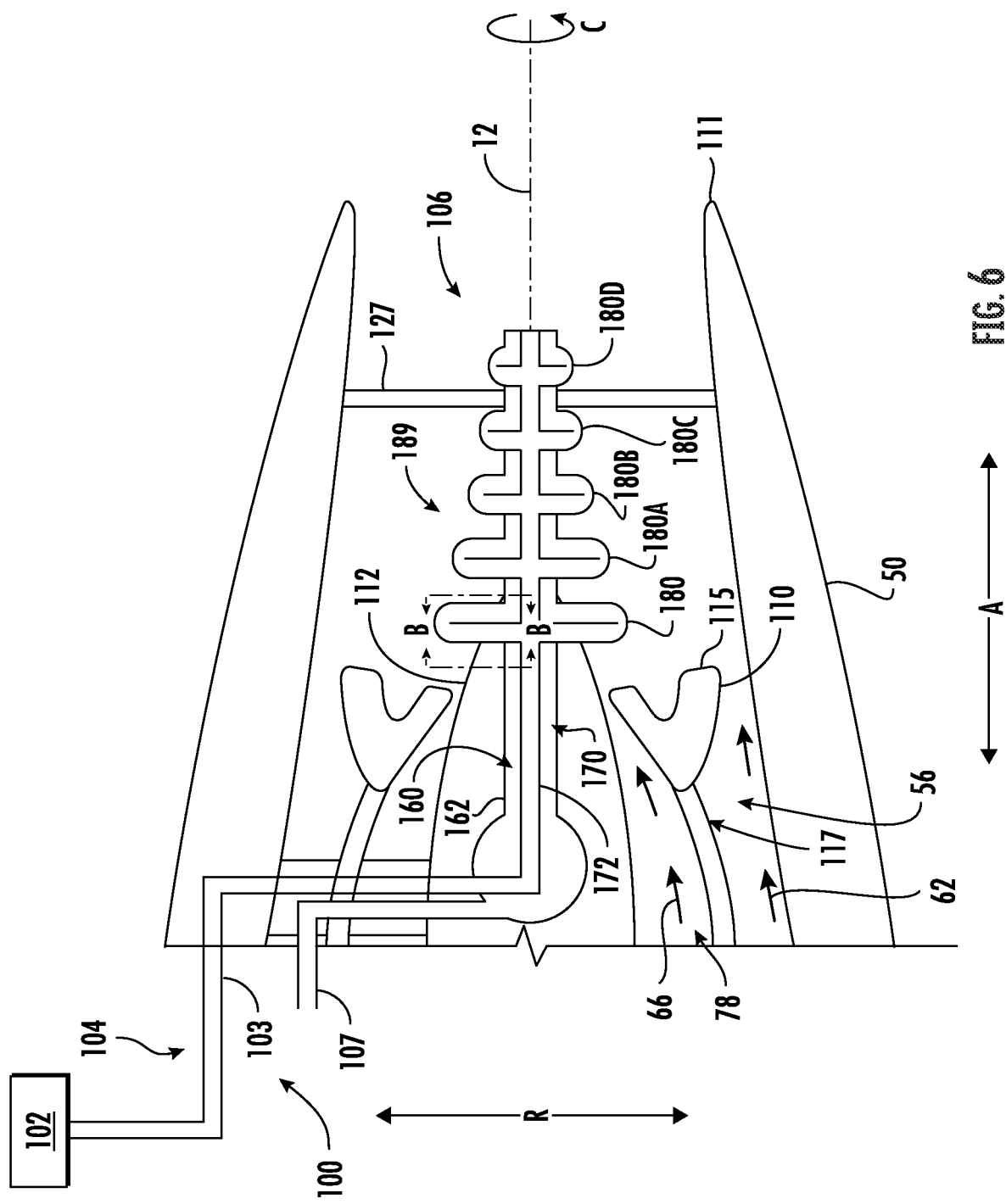
FIG. 6 is a cross-sectional view of an exhaust assembly of a gas turbine engine in accordance with another exemplary aspect of the present disclosure.

Referring now to FIG. 6, a cross-sectional view of a gas turbine engine 10 having an exhaust assembly 106 in accordance with another exemplary aspect of the present disclosure is provided. The exemplary gas turbine engine 10 and exhaust assembly 106 of FIG. 6 may be configured in substantially the same manner as the exemplary gas turbine engine 10 and exhaust assembly 106 of FIG. 2, and accordingly, the same or similar numbers may refer to the same or similar parts.

For example, the exemplary exhaust assembly 106 of FIG. 6 generally includes a nacelle 50 defining a bypass airflow passage 56 having a bypass airflow 62 extending therethrough. The nacelle 50 defines a fan exit aperture 111 at a downstream end. The exhaust assembly 106 also includes a tail cone 112 and a core nozzle 117 circumferentially surrounding at least a portion of the tail cone 112. The core nozzle 117 defines a hot gas flow path 78 having a working gas flow 66 extending therethrough. It should be appreciated that the hot gas flow path 78 of FIG. 6 is configured in a same or similar manner to the hot gas flow path 78 of FIGS. 1 and 2.

Additionally, the core nozzle 117 generally includes a plurality of lobes 110 that radially extend into the bypass airflow passage 56 and define a core exit aperture 115. The plurality of lobes 110 and are shaped to mix the bypass airflow 62 with the working gas flow 66. Such mixing of the bypass airflow 62 and the working gas flow 66 may result in increased thrust generated by the gas turbine engine.

FIG. 6 also generally shows a fuel system 100 that may be configured in substantially the same manner as the exemplary fuel system 100 of FIGS. 1 and 2, and accordingly, the same or similar numbers may refer to the same or similar parts.

For example, the exemplary fuel system 100 of FIG. 6 generally includes one or more hydrogen fuel tanks 102 for holding hydrogen fuel in a liquid phase and a hydrogen delivery assembly 104 in thermal communication with the exhaust assembly 106. The hydrogen delivery assembly 104 generally includes a liquid hydrogen line 103, a heat exchanger 105, and a gaseous hydrogen line 107.

However, for the embodiment of FIG. 6, the heat exchanger 105 is coupled to or integrated into the tail cone 112 of the exhaust assembly 106. More specifically, for the embodiment depicted, the heat exchanger 105 is coupled to the tail cone 112. Additionally, a plurality of support struts 127 are coupled to the nacelle and are configured to support the heat exchanger 105. The plurality of support struts 127 are located downstream of the core nozzle 117 and core exit aperture 115.

Additionally, the heat exchanger includes an inner wall 172 and an outer wall 162 that circumferentially surrounds the inner wall 172. The inner wall generally defines a first axial flow path 170 that is in flow communication with the one or more hydrogen fuel tanks 102. It should be appreciated that the first axial flow path 160 may have a liquid hydrogen fuel 85 flowing within (see FIG. 7; described in more detail below). Further, the inner wall and the outer wall together define a second axial flow path 160 in flow communication with a combustion section (e.g., combustion section 26 of FIG. 1) of the gas turbine engine 10. It should be appreciated that the second axial flow path 160 may have a gaseous hydrogen fuel 91 flowing within (see FIG. 7; described in more detail below). As will be appreciated, the heat exchanger additionally defines a radial flow path 180 that is in flow communication with the first axial flow path 170 and the second axial flow path 160.

Figure 7:
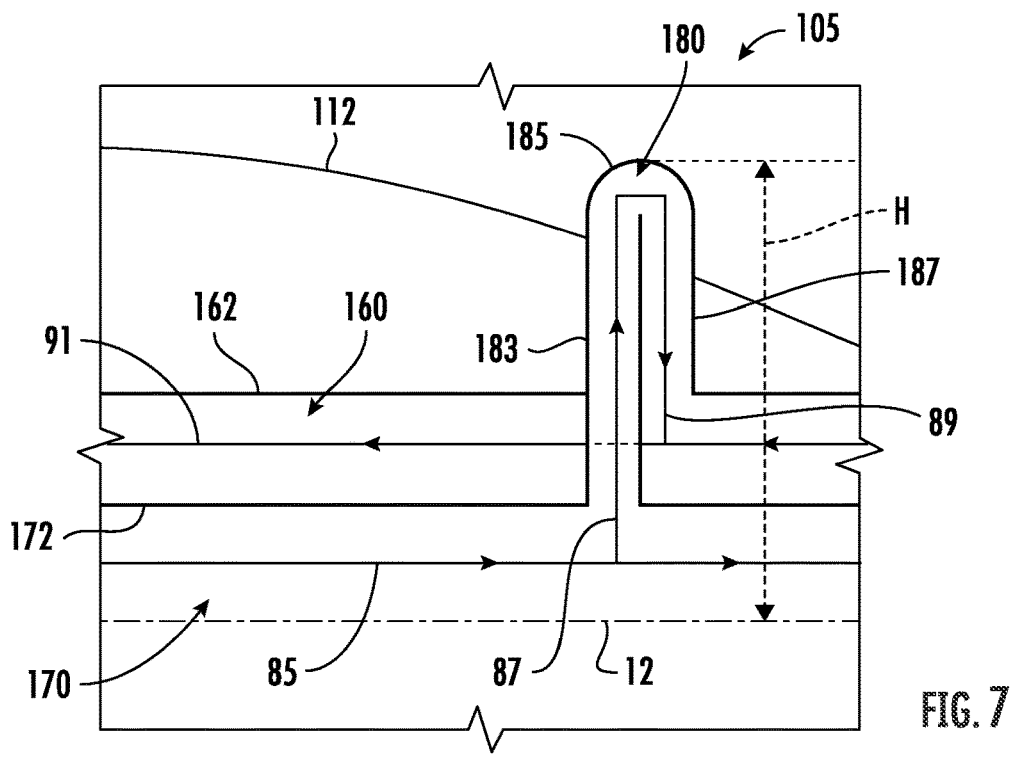
FIG. 7 is a cross-sectional view of a heat exchanger of the exemplary exhaust assembly of FIG. 6 in accordance with the exemplary aspect of the present disclosure.

Referring now briefly to FIG. 7, a close-up cross sectional view of the heat exchanger 105 of FIG. 6 taken along line B-B is provided. The radial flow path 180 includes a first portion 183, a connector portion 185, and a second portion 187. The first portion 183 extends from the inner wall 172 to the connector portion 185. The connector portion 185 extends from the first portion 183 to the second portion 187 in an arched manner. Additionally, the second portion 187 extends from the connector portion 185 to the outer wall 162. It should be appreciated that at least a portion of the first portion 183, at least a portion of the connector portion 185, at least a portion of the second portion 187, or a combination thereof may be in thermal communication with the working gas flow 66 to change the phase of a hydrogen fuel within.

During an operating condition, liquid hydrogen fuel 85 may flow through the first axial flow path 170. A portion 87 of the liquid hydrogen fuel 85 flowing through the first axial flow path 170 is directed or routed into the first portion 183 of the radial flow path 180. The working gas flow 66 may heat the first portion 183 to change the phase of the portion 87 flowing within the first portion 183 from a liquid phase to a gaseous phase. The hydrogen fuel 85 in the gaseous phase, gaseous hydrogen fuel 91, may be directed or routed radially outward into the connector portion 185. The connector portion 185 may direct or route the portion 89 of hydrogen fuel 85 to the second portion 187. The portion 89 of the hydrogen fuel 85 in the second portion 187 may flows into the second axial flow path 160.

As depicted, the flow of hydrogen fuel 85 in the first axial flow path 170 is in a first direction, and the flow of hydrogen fuel 91 in the second axial flow path 160 is in a second direction opposite the first direction.

It should be appreciated that the connector portion 185 extending from the first portion 183 to the second portion 187 in an arched manner is provided by way of example only. For example, in alternative exemplary embodiments the connector portion 185 connect the first portion 183 and the second portion 187 in any suitable manner.

Referring back now to FIG. 6, as depicted the radial flow path 180 is configured as a first plurality of radial flow paths 180. More particularly, the first plurality of radial flow paths 180 are circumferentially spaced (i.e., spaced along a circumferential direction C) around the outer wall 162.

Additionally, in the exemplary embodiment depicted the heat exchanger 105 may includes a second, a third, a fourth, and a fifth plurality of flow paths 180A, 180B, 180C, and 180D configured in a same or similar manner of as the first plurality of radial flow paths 180. The first, the second, the third, the fourth, and the fifth plurality of radial flow paths 180, 180A, 180B, 180C, and 180D, referred to herein as "a plurality of stages 189," are arranged along the axial direction A. Each of the plurality of stages 189 defines a radial height H (see FIG. 7) relative to a centerline 12 of the gas turbine engine along the radial direction R. The radial height H of each of the plurality of stages 189 decreases along the axial direction A in the downstream direction.

It should be appreciated that the plurality of stages 189 may include any number of pluralities of radial flow paths.

Further, the plurality of stages 189 are positioned downstream of the core nozzle 117. As described above, during an operating condition, the plurality of lobes 110 of the core nozzle 117 are configured to mix the working gas flow 66 and the bypass airflow 62. However, a portion of the working gas flow 66 may pass through the core exit aperture 115 without mixing with the bypass airflow 62. In the exemplary embodiment depicted, this working gas flow 66 that has not mixed with the bypass airflow 62, herein referred to as "unmixed working gas flow 66" is used to heat the heat exchanger 105 to change the phase of the hydrogen fuel flowing within. More specifically, this unmixed working gas flow 66 is used to heat the plurality of radial flow paths 180 to change the phase of the hydrogen fuel flowing within.

Figure 8:
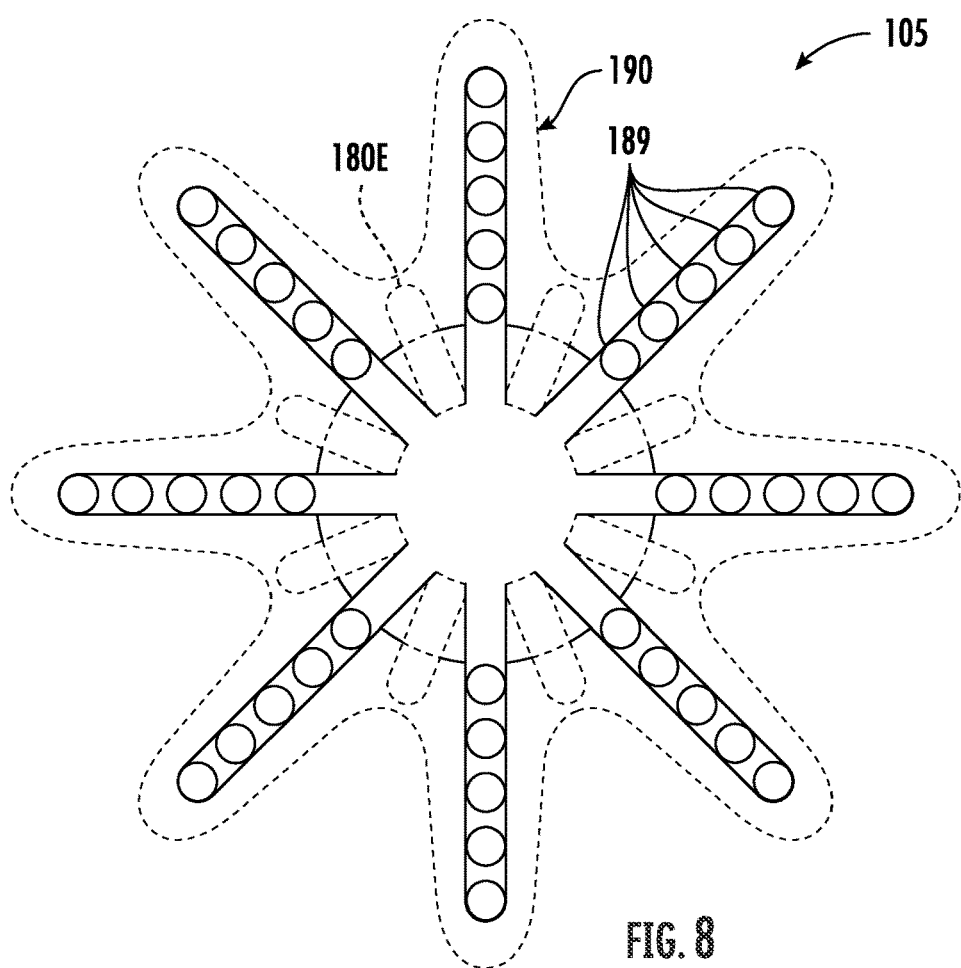
FIG. 8 is an aft looking forward view of the heat exchanger of the exemplary exhaust assembly of FIG. 7 in accordance with the exemplary aspect of the present disclosure.

For example, referring now briefly to FIG. 8, an aft looking forward view of the heat exchanger 105 of FIG. 6 is provided. As is depicted in FIG. 8, the plurality of stages 189 are bathed in the unmixed working gas flow 66. As referred to herein, "bathed in" refers to the envelopment of the plurality of stages 189 in the unmixed working gas flow 66. Further, it should be appreciated that the unmixed working gas flow 66 is in thermal communication with the plurality of stages 189 and more particularly as described above, the unmixed working gas flow 66 is used to heat the plurality of stages 189 to change the phase of the hydrogen fuel flowing within during an operating condition. Additionally, the unmixed working gas flow 66 defines a radial flow channel 190.

Referring still to FIG. 8, it should be appreciated that in alternative exemplary embodiments each of the plurality of stages 189 may be clocked at different positions. As used herein "clocked" refers to a plurality of radial flow paths being positioned circumferentially at a different location than another plurality of radial flow paths positioned upstream. In such a manner, each plurality of radial flow paths may be bathed in a portion of the unmixed working gas flow that has not been used to heat another plurality of radial flow paths. For example, the plurality of stages 189 may additionally include a sixth plurality of radial flow paths 180E (depicted in phantom) positioned downstream of the plurality of radial flow paths 180A, 180B, 180C, or 180D. As depicted, the plurality of radial flow paths 180E are clocked at a different positioned so that the plurality of radial flow paths 180E are positioned at a different location than another plurality of radial flow paths (e.g., plurality of radial flow paths 180A, 180B, 180C, or 180D).

It should be appreciated that the outer wall 162 circumferentially surrounding the inner wall 172 is provided by way of example only. In alternative exemplary embodiments the outer wall 162 and the inner wall 172 may run parallel to one another.

Figure 9:
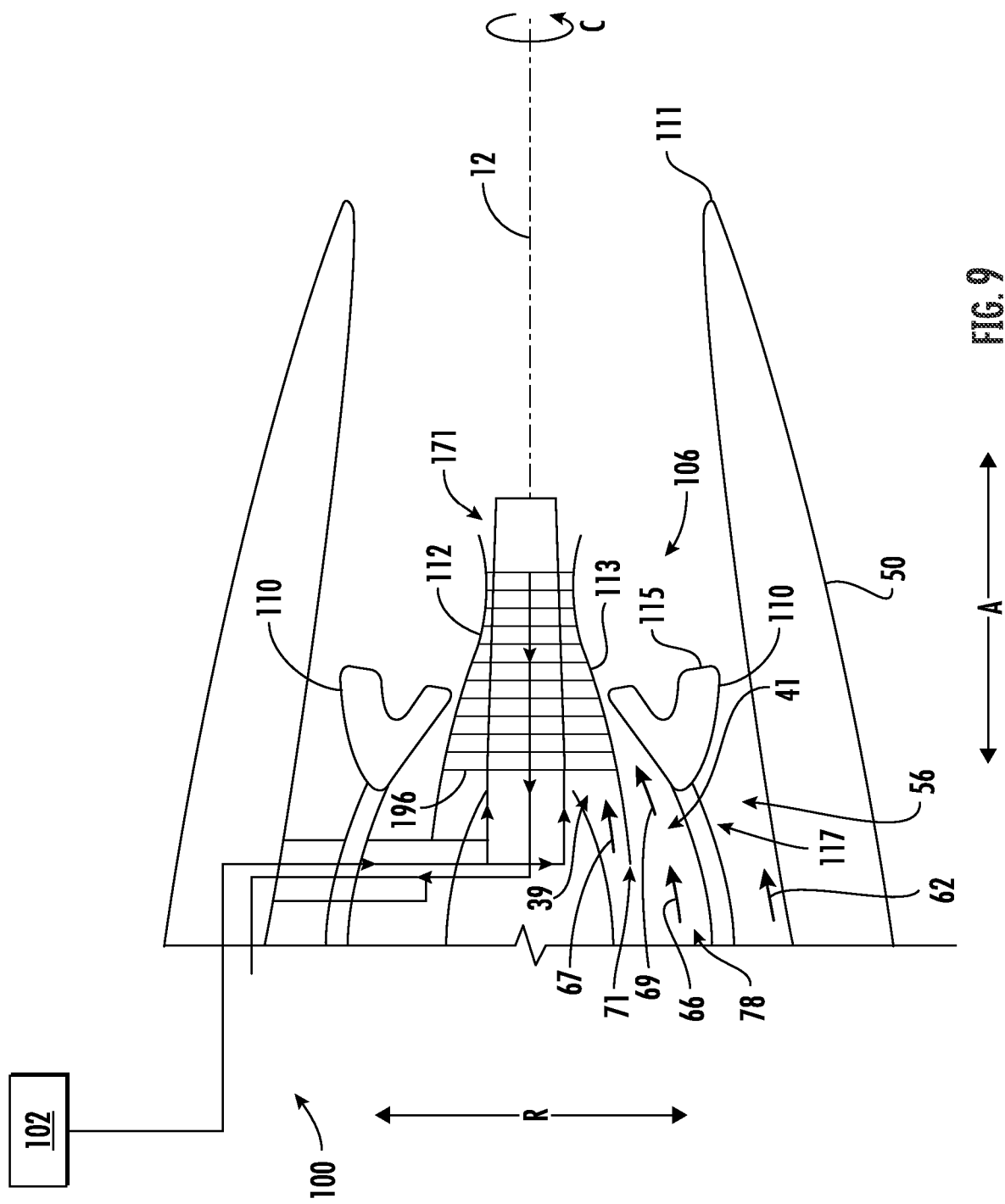
FIG. 9 is a cross-sectional view of an exhaust assembly of a gas turbine engine in accordance with another exemplary aspect of the present disclosure.

Referring now to FIG. 9, a cross-sectional view of a gas turbine engine 10 and exhaust assembly 106 in accordance with another exemplary aspect of the present disclosure is provided. The exemplary exhaust assembly 106 of FIG. 9 may be configured in substantially the same manner as the exemplary exhaust assembly 106 of FIGS. 2 and 6, and accordingly, the same or similar numbers may refer to the same or similar parts.

For example, the exemplary gas turbine engine 10 of FIG. 9 generally includes a nacelle 50 defining a bypass airflow passage 56 having a bypass airflow 62 extending therethrough. The nacelle 50 defines a fan exit aperture 111 at a downstream end. The exhaust assembly 106 includes a tail cone 112 and a core nozzle 117 circumferentially surrounding at least a portion of the tail cone 112. The core nozzle 117 defines a hot gas flow path 78 having a working gas flow 66 extending therethrough. It should be appreciated that the hot gas flow path 78 of FIG. 9 is configured in a same or similar manner to the hot gas flow path 78 of FIGS. 1, 2, and 6.

Additionally, the core nozzle 117 generally includes a plurality of lobes 110 that radially extend into the bypass airflow passage 56 and that define a core exit aperture 115. The plurality of lobes 110 and are shaped to mix the bypass airflow 62 with the working gas flow 66. Such mixing of the bypass airflow 62 and the working gas flow 66 may result in increased thrust generated by the gas turbine engine.

FIG. 9 also generally shows a fuel system 100 that may be configured in substantially the same manner as the exemplary fuel system 100 of FIGS. 1, 2 and 6, and accordingly, the same or similar numbers may refer to the same or similar parts.

For example, the exemplary fuel system 100 of FIG. 9 generally includes one or more hydrogen fuel tanks 102 for holding hydrogen fuel in a liquid phase and a hydrogen delivery assembly 104 in thermal communication with the long-duct mixed flow exhaust assembly 106. The hydrogen delivery assembly 104 generally includes a liquid hydrogen line 103, a heat exchanger 105, and a gaseous hydrogen line 107.

However, for the embodiment of FIG. 9 the heat exchanger 105 is positioned within the tail cone 112. Additionally, the tail cone 112 of the exemplary embodiment defines an inner path outlet 171 (described in more detail below).

In the exemplary embodiment depicted, the heat exchanger 105 includes a plurality of fins 196. The plurality of fins 196 extend radially outward from a first liquid hydrogen line 103 and are configured to receive heat to change the phase of the hydrogen fuel. Additionally, the tail cone 112 of the exhaust assembly 106 further defines an outer surface 113. The hot gas flow path 78 defines an inner flow path 39 and an outer flow path 41. More particularly, the inner flow path 39 has a first portion 67 of the working gas flow 66 extending therethrough and the outer flow path 41 has a second portion 69 of the working gas flow extending therethrough. The first portion is up to 15% of the working gas flow. Further, the tail cone includes a splitter 71 that is configured to split the working gas flow into the first portion 67 and the second portion 69.

It should be appreciated that the first portion 67 being up to 15% of the working gas flow 66 is provided by way of example only. For example, the first portion 67 may be up to 10% of the working gas flow 66, such as up to 8%, such as up to 5%, such as at least 1%.

Additionally, it should be appreciated that the inner flow path 39 and the outer flow path 41 are configured as a parallel flow. For example, during an operating condition, the first portion 67 of the working gas flow 66 may directly heat the heat exchanger 105. More particularly, the first portion 67 of the inner flow path 39 is in communication with the plurality of fins 196. The outer flow path 41 is located outward of the outer surface 113 of the tail cone 112 in the radial direction R.

Moreover, it will be appreciated that by inclusion of the inner flow path 39 in parallel with the outer flow path 41 may allow for inclusion of a more efficient heat exchanger 105 by allowing for a higher pressure drop across the heat exchanger 105 without negatively affecting a flow of a majority of the working gas flow 66 through the hot gas flow path 78.

The heat exchanger 105 may additionally or alternatively include any heat transfer enhancement feature other than fins. For example, the heat exchanger 105 may include pins, turbulators, conduits, or any suitable heat transfer enhancement. Additionally, the heat exchanger 105 may not be a block heat exchanger, and instead the inner flow path 39 may be an annular flow path and the heat exchanger 105 may be an annular heat exchanger.

Figure 10:
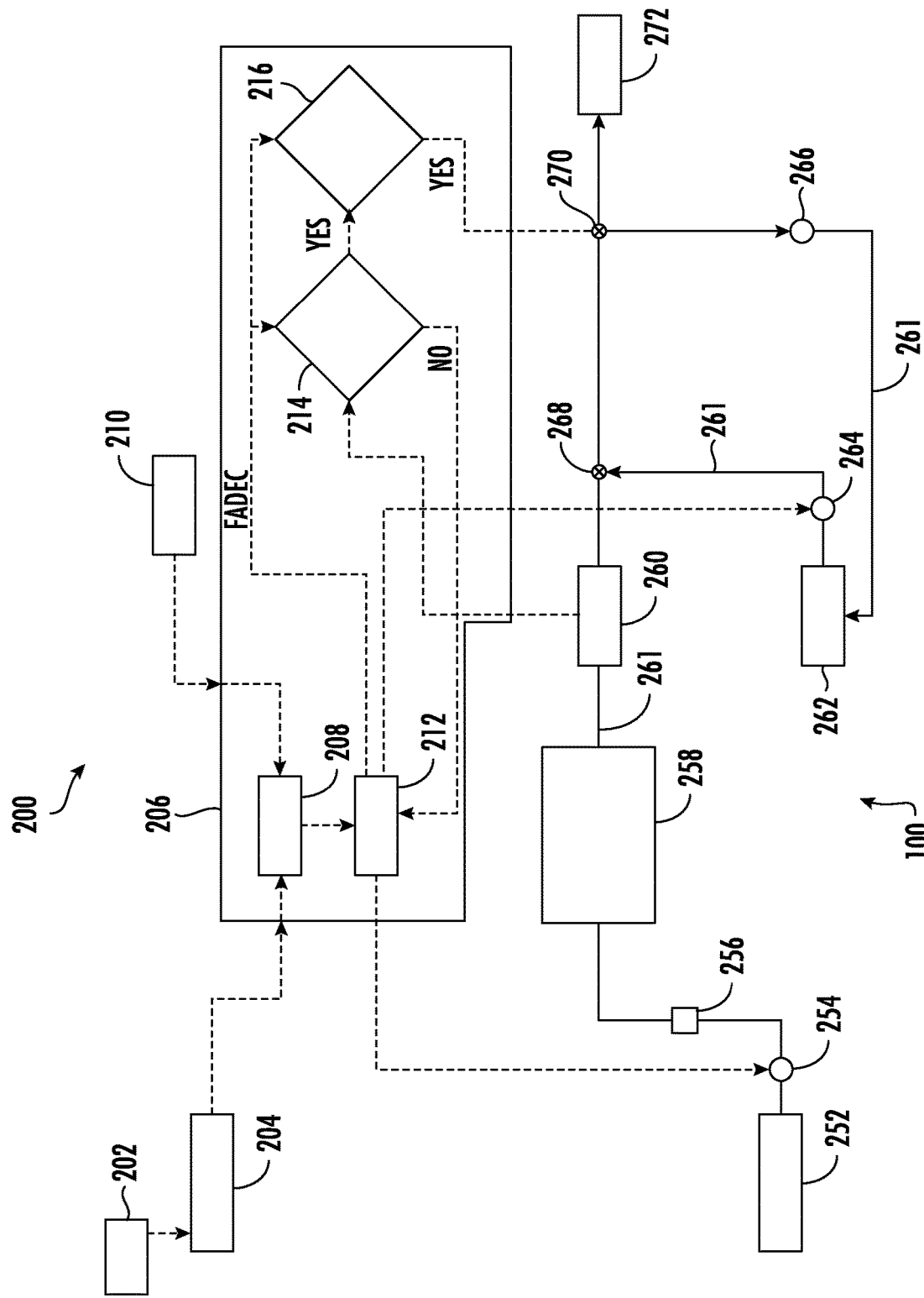
FIG. 10 is a control system including a method of operating a hydrogen delivery assembly of a fuel system in accordance with an exemplary aspect of the present disclosure.

Referring now to FIG. 10, a schematic flow diagram of a control system 200 that controls an operation of a fuel system 100 for a gas turbine engine is provided. It should be appreciated that the control system 200 may be incorporated into FIGS. 1 through 9 to operate the fuel systems 100 FIGS. 1 through 9.

The fuel system 100 of the exemplary embodiment includes a liquid hydrogen fuel tank 252 configured to hold a hydrogen fuel in a liquid phase, a liquid pump 254 in fluid communication with the liquid hydrogen fuel tank 252 configured to generate a flow of hydrogen fuel in a liquid phase, a liquid hydrogen meter 256 configured to measure a flow of hydrogen fuel in a liquid phase, and a hydrogen delivery assembly 258 in fluid communication with the liquid hydrogen fuel tank 252 at a location downstream of the liquid pump 254 configured to receive liquid hydrogen fuel and convert the liquid hydrogen fuel from a liquid phase to a gaseous phase.

The fuel system additionally includes a gaseous fuel line 261 configured to receive gaseous hydrogen fuel from the hydrogen delivery assembly 258; a gaseous hydrogen meter 260 fluidly coupled to the gaseous fuel line 261 configured to measure a flow of hydrogen fuel in a gaseous phase through the gaseous fuel line 261; a gaseous hydrogen fuel tank 262 fluidly coupled to the gaseous fuel line 261 at a location downstream of the gaseous hydrogen meter 260 configured to hold hydrogen fuel in a gaseous phase; a first gaseous pump 264 fluidly coupled to the gaseous hydrogen fuel tank 262 between the gaseous hydrogen fuel tank 262 and the gaseous fuel line 261 configured to generate a flow of hydrogen fuel out of the gaseous hydrogen fuel tank 262 to the gaseous fuel line 261; a second gaseous pump 266 similarly fluidly coupled to the gaseous hydrogen fuel tank 262 between the gaseous hydrogen fuel tank 262 and the gaseous fuel line 261 configured to generate a flow of hydrogen fuel in a gaseous phase into the gaseous hydrogen fuel tank 262 from the gaseous fuel line 261; and a combustion section 272 configured to combust hydrogen fuel in a gaseous phase.

The control system 200 receives a pilot command 202 from an operator of the gas turbine engine. More particularly, the pilot command 202 is used to indicate a specified engine power setting 204. It should be appreciated that the specified engine power setting 204 may be an operating condition of the gas turbine engine.

The exemplary control system 200 includes a controller 206. The controller 206 may be a full authority digital engine control controller (FADEC), or other suitable engine controller. The controller 206 is configured to receive the engine power setting data 204.

The controller 206 is operable to receive and store data 208 such as the engine power setting data 204. Additionally, or alternately, the data 208 received may be from a sensor 210, such as sensor 412 of FIG. 2. In the exemplary embodiment depicted the sensor 210 is a temperature sensor that measures data indicative of a temperature of an exhaust assembly (see FIGS. 2, 6 and 9) of the gas turbine engine.

Additionally, the controller 206 includes a fuel management unit 212, referred to herein as "FMU 212", that is in communication with the data 208. The FMU 212 is configured to determine an amount of hydrogen fuel in the gaseous phases needed in response to receiving the data 208. Further, the FMU 212 is configured to provide commands to the liquid pump 254, the first gaseous pump 264, and the second gaseous pump 266 to provide hydrogen fuel.

The controller 206 further includes a first module 214 and a second module 216. The first module 214 received data indicative of the amount of hydrogen fuel in the gaseous phase needed that was determined by the FMU 212. Additionally, the first module 214 determines if the hydrogen delivery assembly 258 has converted the desired amount of hydrogen fuel from a liquid phase to a gaseous phase. More particularly, the first module 214 is in communication with the gaseous hydrogen meter 260 to determine the amount of hydrogen fuel in a gaseous phase converted by the hydrogen delivery assembly.

The first module 214 compares the desired amount determined by the FMU 212 and the actual amount converted by the hydrogen delivery assembly 258 (as measured by the gaseous hydrogen meter 260). If the actual amount of hydrogen fuel in the gaseous phase does not meet the desired amount of hydrogen fuel in the gaseous phase, the FMU 212 provides a signal to the first gaseous pump 264 to generate a flow of hydrogen fuel from the gaseous hydrogen fuel tank 262. A first valve 268 of the fuel system, positioned in flow communication between the gaseous hydrogen fuel tank 262 and the gaseous fuel line 261, is opened to allow the flow of hydrogen fuel in the gaseous phase to go to the combustion section 272.

If the actual amount of hydrogen fuel in the gaseous phase does meet the desired amount of hydrogen fuel in the gaseous phase. The second module 216 received data indicative of the amount of hydrogen fuel in the gaseous phases needed that was determined by the FMU 212. Additionally, the second module 216 determines if the hydrogen delivery assembly 258 has converted the desired amount of hydrogen fuel from a liquid phase to a gaseous phase. More particularly, the second module 216 is in communication with the gaseous hydrogen meter 260 to determine the amount of hydrogen fuel in a gaseous phase converted by the hydrogen delivery assembly.

The second module 216 compares the desired amount determined by the FMU 212 and the actual amount converted by the hydrogen delivery assembly 258 (as measured by the gaseous hydrogen meter 260). If the actual amount of hydrogen fuel in the gaseous phase exceeds the desired amount of the hydrogen fuel in the gaseous phase, the FMU 212 provides a signal to the second gaseous pump 266 to generate a flow of the hydrogen fuel in the gaseous phase to the gaseous hydrogen fuel tank 262.

Figure 11:
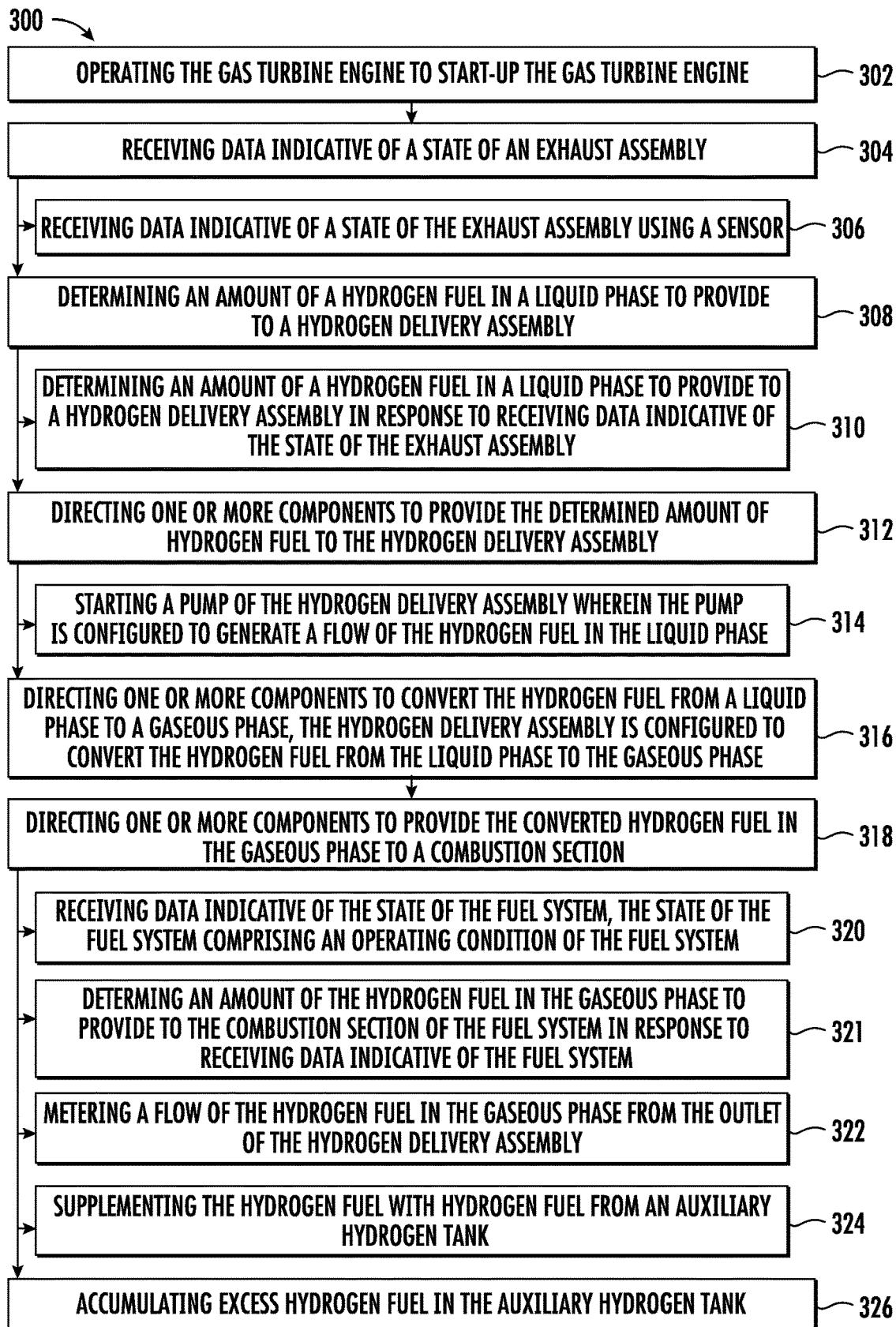
FIG. 11 is a flow diagram of a method of operating a fuel system of a gas turbine engine in accordance with an exemplary aspect of the present disclosure.

Referring now to FIG. 11, a flow diagram of a method 300 of operating a fuel system 100 for a gas turbine engine is provided. In at least certain embodiments; the method 300 may be utilized to operate one or more of the exemplary fuel systems 100 described with reference FIGS. 1 through 9. For example, the fuel system 100 may generally include a hydrogen delivery assembly, one or more hydrogen fuel tanks 102 for holding a hydrogen fuel. More particularly, the hydrogen delivery assembly may be in thermal communication with the exhaust assembly. It should be appreciated that the hydrogen delivery assembly of the fuel system 100 may include a heat exchanger such as the heat exchangers of FIGS. 1 through 9. Additionally, the method 300 may be implemented by one or more controllers, such as by using an exemplary computing system depicted in FIG. 12 and described below.

The method 300 generally includes at (302) operating the gas turbine engine to start-up the gas turbine engine. Operating the gas turbine engine to start-up the gas turbine engine at (302) may include accelerating the gas turbine engine with a starter, such as a starter motor/generator or a pneumatic starter; initiating a fuel flow to a combustion section of the gas turbine engine once a rotational speed of the gas turbine engine reaches a lightoff speed; and accelerating the gas turbine engine from the lightoff speed to an idle speed.

The method 300 additionally includes at (304) receiving data indicative of a state of the exhaust assembly, and more particularly for the exemplary aspect depicted, receiving data indicative of the state of the exhaust assembly at (304) includes at (306) receiving data indicative of the state of the exhaust assembly using a sensor, such as sensor 412. For the exemplary aspect of FIG. 10, the state of the exhaust assembly includes a temperature of a working gas flow flowing through a hot gas flow path. The sensor, such as sensor 412 of the exhaust assembly, for the exemplary aspect depicted, is a temperature sensor.

Referring still to FIG. 10, the method 300 includes at (308) determining an amount of a hydrogen fuel in a liquid phase to provide to the hydrogen delivery assembly. Moreover, it will be appreciated that for the exemplary aspect depicted, determining the amount of the hydrogen fuel in the liquid phase to provide to the hydrogen delivery assembly includes at (310) determining the amount of the hydrogen fuel in the liquid phase to provide to the hydrogen delivery assembly in response to receiving data indicative of the state of the exhaust assembly.

It will be appreciated that the data received at (304) may not be directly sensed data of the state of the exhaust assembly. For example, although not depicted, the method 300 may include one or more intervening steps of determining a state of the exhaust assembly based on the data received at (304), including, e.g., executing a calculation, a comparison, or a model to determine the data indicative of the state of the exhaust assembly. With such an exemplary aspect, determining the amount of the hydrogen fuel in the liquid phase to provide to the hydrogen delivery assembly at (310) may include determining the amount of the hydrogen fuel in the liquid phase to provide to the hydrogen delivery assembly in response to receiving data indicative of the state of the exhaust assembly through the one or more intervening steps of (using, e.g., a calculation, a comparison, or a model).

Further, the method 300 includes at (312) providing the determined amount of the hydrogen fuel to the hydrogen delivery assembly. It will be appreciated that for the exemplary aspect depicted, providing the determined amount of the hydrogen fuel to the hydrogen delivery assembly includes at (314) operating a pump of a hydrogen delivery assembly. It should be appreciated that the pump may be configured as a liquid pump and more particularly, may be configured to generate a flow of the hydrogen fuel in the liquid phase. Additionally, the method 300 includes at (316) converting the hydrogen fuel from the liquid phase to the gaseous phase. The hydrogen delivery assembly is configured to convert the hydrogen fuel from the liquid phase to the gaseous phase.

Referring still to FIG. 11, the method 300 includes at (318) providing the gaseous hydrogen fuel to a combustion section. Providing the gaseous hydrogen fuel to the combustion section at (318) includes at (320) receiving data indicative of the state of the hydrogen delivery assembly, and more particularly for the exemplary aspect depicted, receiving data indicative of the state of the hydrogen delivery assembly includes receiving data indicative of the state of the hydrogen delivery assembly using a sensor, such as sensor 412. For the exemplary aspect of FIG. 11, the state of the hydrogen delivery assembly includes an amount hydrogen fuel in the gaseous state. Further, the method includes at (321) determining an amount of the hydrogen fuel in the gaseous phase to provide to the combustion section of the fuel system in response to receiving data indicative of the fuel system.

Additionally, the method includes at (322) metering a flow of the hydrogen fuel in the gaseous phase from an outlet of the hydrogen delivery assembly. Moreover, the method includes at (324) supplementing the hydrogen fuel in the gaseous phase with an auxiliary hydrogen fuel in the gaseous phase from an auxiliary hydrogen fuel tank. Further, the method includes at (326) accumulating excess hydrogen fuel in the auxiliary hydrogen fuel tank.

It will be appreciated that fuel system 100 may include a computing device or controller operable with certain aspects of the fuel system 100 for controlling various aspects of the fuel system 100. The computing device may be part of the computing system. In such a manner, it will be appreciated that the fuel system 100 may further include a sensory for sensing data indicative of the state of the exhaust assembly. For example, the sensor 412 may be configured to sense data indicative of a temperature of the working gas flow of the exhaust assembly 106.

Figure 12:
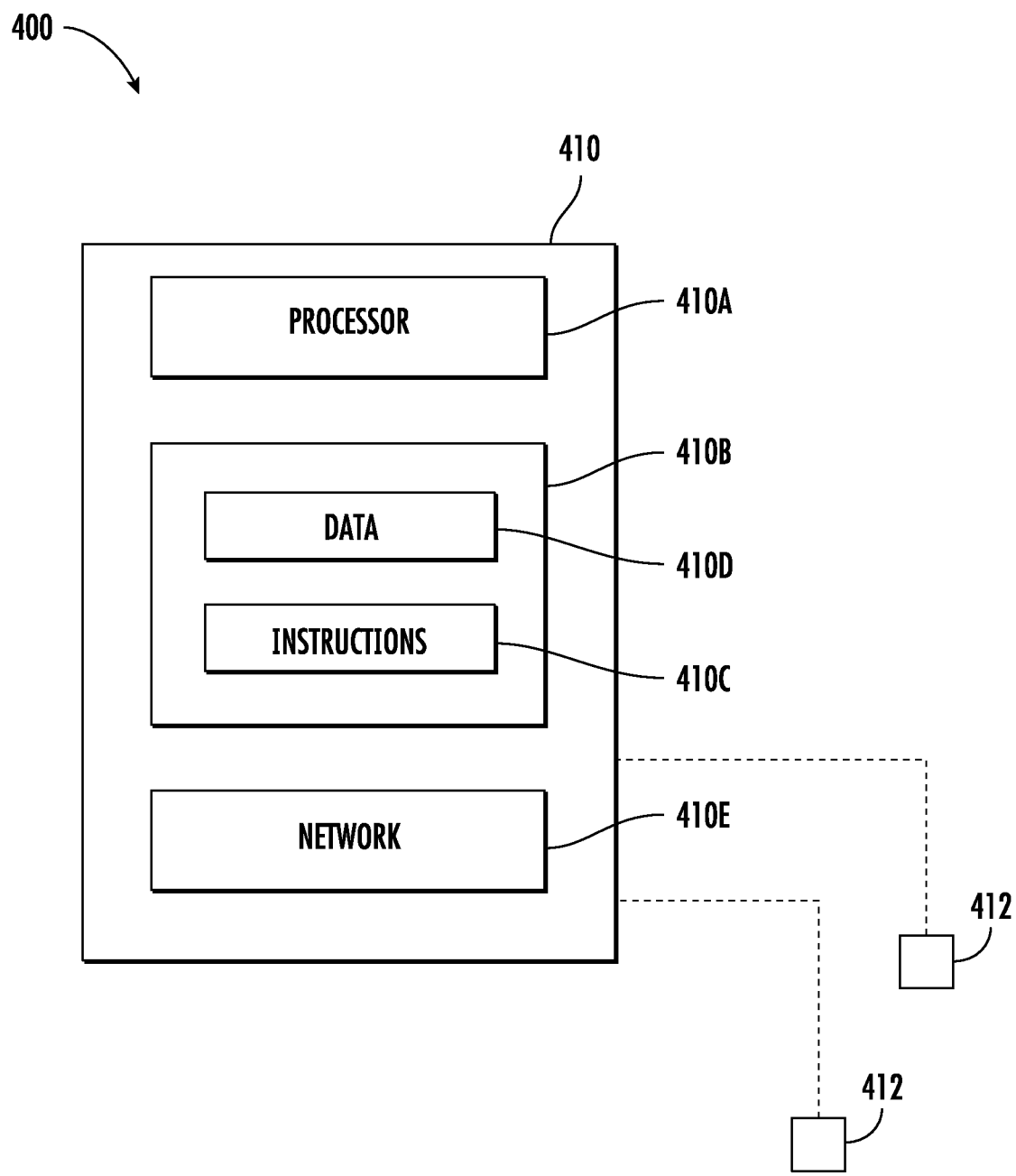
FIG. 12 is a block diagram of one embodiment of an exemplary controller that may be used within the fuel system.

Referring now to FIG. 12, the example computing system 400 for operable use with certain aspects of the fuel system 100, as referred to with respect to FIG. 12 is provided. The computing system 400 can be used, for example, as a controller of a fuel system 100. The computing device(s) 410 can include one or more processor(s) 410A and one or more memory device(s) 410B. The one or more processor(s) 410A can include any suitable processing device, such as a microprocessor, microcontroller, integrated circuit, logic device, or other suitable processing device. The one or more memory device(s) 410B can include one or more computer-readable media, including, but not limited to, non-transitory computer-readable media, RAM, ROM, hard drives, flash drives, or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 or the computing device(s) 310 are configured, the operations for operating a fuel system 100 (e.g., method 300), as described herein, or any other operations or functions of the one or more computing device(s) 410. The instructions 410C can be software written in any suitable programming language or can be implemented in hardware. Additionally, or alternatively, the instructions 410C can be executed in logically or virtually separate threads on processor(s) 410A. The memory device(s) 410B can further store data 410D that can be accessed by the processor(s) 410A. For example, the data 410D can include data indicative of power flows, data indicative of engine/aircraft operating conditions, or any other data or information described herein.

The computing device(s) 410 can also include a network interface 410E used to communicate, for example, with the other components of the fuel system 100, gas turbine engine, etc. (e.g., via a network), such as one or more sensors 412. The network interface 410E can include any suitable components for interfacing with one or more network(s), including for example, transmitters, receivers, ports, controllers, antennas, or other suitable components. One or more external display devices (not depicted) can be configured to receive one or more commands from the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects are provided by the subject matter of the following clauses:

A gas turbine engine comprising: a turbomachine comprising a combustion section and an exhaust assembly arranged in serial flow order; and a fuel system comprising: a hydrogen fuel tank for holding a hydrogen fuel in a liquid phase; and a hydrogen delivery assembly in thermal communication with the exhaust assembly, the hydrogen delivery assembly comprising: a liquid hydrogen line in fluid communication with the hydrogen fuel tank; a gaseous hydrogen line in fluid communication with the combustion section of the gas turbine engine; and a heat exchanger tubing positioned within the exhaust assembly downstream of the liquid hydrogen line and upstream of the gaseous hydrogen line.

The gas turbine engine of any preceding clause, wherein the exhaust assembly comprises a tail cone and a core nozzle circumferentially surrounding at least a portion of the tail cone, wherein the core nozzle comprises a plurality of lobes, the plurality of lobes positioned circumferentially within the exhaust assembly, wherein the heat exchanger tubing is a plurality of heat exchanger tubing, and wherein the plurality of heat exchanger tubing is positioned in the plurality of lobes, are formed integrally with the plurality of lobes, or both.

The gas turbine engine of any preceding clause, wherein the plurality of lobes defines an inner surface and an outer surface, wherein the plurality of heat exchanger tubing is positioned between the inner surface and the outer surface.

The gas turbine engine of any preceding clause, wherein the core nozzle defines a hot gas flow path with the tail cone, wherein the exhaust assembly comprises a nacelle defining a bypass airflow passage, wherein the inner surface is in thermal communication with the hot gas flow path, wherein the outer surface is in thermal communication with the bypass airflow passage.

The gas turbine engine of any preceding clause, wherein the inner surface is configured to transfer heat from the hot gas flow path to the heat exchanger tubing, wherein the core nozzle comprises a thermal insulation between the heat exchanger tubing and the outer surface.

The gas turbine engine of any preceding clause, wherein the plurality of lobes comprises a first wall and a second wall, and wherein the plurality of heat exchanger tubing extends circumferentially around the first wall and the second wall, is positioned on or integrated into the first wall, is positioned on or integrated into the second wall, or a combination thereof.

The gas turbine engine of any preceding clause, wherein the fuel system further comprises: an auxiliary hydrogen fuel tank for holding an auxiliary hydrogen fuel in a gaseous phase.

The gas turbine engine of any preceding clause, wherein the exhaust assembly is configured to provide heat to the hydrogen delivery assembly to change a phase of the hydrogen fuel.

The gas turbine engine of any preceding clause, wherein the heat exchanger tubing defines a liquid portion and a gaseous portion and wherein, during operation of the fuel system, the hydrogen fuel is in the liquid phase in the liquid portion and in a gaseous phase in the gaseous portion.

The gas turbine engine of any preceding clause, wherein the exhaust assembly comprises a strut, wherein the liquid hydrogen line extends from the hydrogen fuel tank to the heat exchanger tubing through the strut, and wherein the gaseous hydrogen line extends from the heat exchanger tubing to the combustion section through the strut.

A fuel system for a gas turbine engine, the gas turbine engine comprising a combustion section and an exhaust assembly, the fuel system comprising: a hydrogen fuel tank for holding a hydrogen fuel in a liquid phase; and a hydrogen delivery assembly in thermal communication with the exhaust assembly, the hydrogen delivery assembly comprising: a liquid hydrogen line in fluid communication with the hydrogen fuel tank; a gaseous hydrogen line in fluid communication with the combustion section of the gas turbine engine; and a heat exchanger tubing positioned within the exhaust assembly downstream of the liquid hydrogen line and upstream of the gaseous hydrogen line.

The fuel system of any preceding clause, wherein the exhaust assembly comprises a tail cone and a core nozzle circumferentially surrounding at least a portion of the tail cone, wherein the core nozzle comprises a plurality of lobes, the plurality of lobes positioned circumferentially within the exhaust assembly, wherein the heat exchanger tubing is a plurality of heat exchanger tubing, and wherein the plurality of heat exchanger tubing is positioned in the plurality of lobes, are formed integrally with the plurality of lobes, or both.

The fuel system of any preceding clause, wherein the plurality of lobes defines an inner surface and an outer surface, wherein the plurality of heat exchanger tubing is positioned between the inner surface and the outer surface.

The fuel system of any preceding clause, wherein the core nozzle defines a hot gas flow path with the tail cone, wherein the exhaust assembly comprises a nacelle defining a bypass airflow passage, wherein the inner surface is in thermal communication with the hot gas flow path, wherein the outer surface is in thermal communication with the bypass airflow passage.

The fuel system of any preceding clause, wherein the inner surface is configured to transfer heat from the hot gas flow path to the heat exchanger tubing, wherein the core nozzle comprises a thermal insulation between the heat exchanger tubing and the outer surface.

The fuel system of any preceding clause, wherein the plurality of lobes comprises a first wall and a second wall, and wherein the plurality of heat exchanger tubing extends circumferentially around the first wall and the second wall, is positioned on or integrated into the first wall, is positioned on or integrated into the second wall, or a combination thereof.

The fuel system of any preceding clause, wherein the fuel system further comprises: an auxiliary hydrogen fuel tank for holding an auxiliary hydrogen fuel in a gaseous phase.

The fuel system of any preceding clause, wherein the exhaust assembly is configured to provide heat to the hydrogen delivery assembly to change a phase of the hydrogen fuel.

The fuel system of any preceding clause, wherein the heat exchanger tubing defines a liquid portion and a gaseous portion and wherein, during operation of the fuel system, the hydrogen fuel is in the liquid phase in the liquid portion and in a gaseous phase in the gaseous portion.

The fuel system of any preceding clause, wherein the exhaust assembly comprises a strut, wherein the liquid hydrogen line extends from the hydrogen fuel tank to the heat exchanger tubing through the strut, and wherein the gaseous hydrogen line extends from the heat exchanger tubing to the combustion section through the strut.

A fuel system for a gas turbine engine comprising an exhaust assembly comprising a tail cone, the fuel system comprising: a hydrogen fuel tank for holding a hydrogen fuel; a heat exchanger coupled to or integrated into the tail cone of the exhaust assembly of the gas turbine engine, the heat exchanger defining a first axial flow path in flow communication with the hydrogen fuel tank; a second axial flow path in flow communication with a combustion section of the gas turbine engine; and a radial flow path in flow communication with the first axial flow path and the second axial flow path.

The fuel system of any preceding clause, wherein the heat exchanger comprises an inner wall and an outer wall circumferentially surrounding the inner wall, wherein the inner wall defines the first axial flow path, and wherein the inner wall and the outer wall together define the second axial flow path.

The fuel system of any preceding clause, wherein the first axial flow path is configured to provide a flow in a first direction, wherein the second axial flow path is configured to provide a flow in a second direction, and wherein the first direction is opposite of the second direction.

The fuel system of any preceding clause, wherein the gas turbine engine defines a working gas flow path having a working gas flow flowing within, wherein the working gas flow is configured to heat the radial flow path to change a phase of the hydrogen fuel.

The fuel system of any preceding clause, wherein the heat exchanger is integrated into the tail cone and wherein the heat exchanger is in thermal communication with the working gas flow path.

The fuel system of any preceding clause, wherein the tail cone comprises an outer surface, wherein the outer surface defines an inner flow path radially inward of the outer surface, the inner flow path in flow communication with the heat exchanger integrated into the tail cone, wherein the outer surface defines an outer flow path radially outward of the outer surface.

The fuel system of any preceding clause, wherein the heat exchanger comprises a plurality of radial flow fins, wherein the plurality of radial flow fins are circumferentially spaced along the first axial flow path.

The fuel system of any preceding clause, wherein the heat exchanger comprises a first portion, a connector portion, and second portion that together define the radial flow path, wherein the first portion extends from the inner wall to the connector portion, wherein the connector portions extends form the first portion to the second portion, and wherein the second portion extends form the connector portion to the outer wall.

The fuel system of any preceding clause, wherein the radial flow path is a plurality of radial flow paths and wherein the plurality the heat exchanger defines a plurality of stages spaced axially apart along the first axial flow path.

The fuel system of any preceding clause, wherein the plurality of radial flow paths are clocked at different positions.

A gas turbine engine comprising: a turbomachine comprising a combustion section and an exhaust assembly arranged in serial flow order and collectively defining a working gas flow path; a fuel system fluidly coupled to the combustion section, the fuel system comprising: a hydrogen fuel tank for holding a hydrogen fuel; a pump fluidly coupled to the hydrogen fuel tank for generating a flow of the hydrogen fuel; and a heat exchanger comprising: a first axial flow path in flow communication with the hydrogen fuel tank; a second axial flow path in flow communication with the combustion section of the gas turbine engine; and a radial flow path in thermal communication with the working gas flow path.

The gas turbine engine of any preceding clause, wherein the heat exchanger comprises an inner wall and an outer wall circumferentially surrounding the inner wall, wherein the inner wall defines the first axial flow path, and wherein the inner wall and the outer wall together define the second axial flow path.

The gas turbine engine of any preceding clause, wherein the first axial flow path is configured to provide a flow in a first direction, wherein the second axial flow path is configured to provide a flow in a second direction, and wherein the first direction is opposite of the second direction.

The gas turbine engine of any preceding clause, wherein a working gas flow through the working gas flow path is configured to heat the radial flow path to change a phase of the hydrogen fuel.

The gas turbine engine of any preceding clause, wherein the turbomachine further comprises a tail cone, wherein the heat exchanger is integrated into the tail cone and wherein the heat exchanger is in thermal communication with the working gas flow path.

The gas turbine engine of any preceding clause, wherein the tail cone comprises an outer surface, wherein the outer surface defines an inner flow path radially inward of the outer surface, the inner flow path is in flow communication with the heat exchanger integrated into the tail cone, wherein the outer surface defines an outer flow path radially outward of the outer surface.

The gas turbine engine of any preceding clause, wherein heat exchanger comprises a plurality of radial flow fins, wherein the plurality of radial flow fins are circumferentially spaced along the first axial flow path.

The gas turbine engine of any preceding clause, wherein the heat exchanger comprises a first portion, a connector portion, and second portion that together define the radial flow path, wherein the first portion extends from the inner wall to the connector portion, wherein the connector portions extends form the first portion to the second portion, and wherein the second portion extends form the connector portion to the outer wall.

The gas turbine engine of any preceding clause, wherein the radial flow path is a plurality of radial flow paths and wherein the plurality the heat exchanger defines a plurality of stages spaced axially apart along the first axial flow path.

The gas turbine engine of any preceding clause, wherein the plurality of radial flow paths are clocked at different positions.

A method of operating a fuel management unit for a fuel system, the method comprising: receiving data indicative of a state of an exhaust assembly using a sensor of the fuel system, the state of the exhaust assembly comprising a temperature of a working gas flow within the exhaust assembly; determining an amount of a hydrogen fuel in a liquid phase to provide to a hydrogen delivery assembly in response to receiving data indicative of the state of the exhaust assembly; and directing one or more components to provide the determined amount of the hydrogen fuel to the hydrogen delivery assembly.

The method of any preceding clause, wherein directing one or more components to provide the determined amount of the hydrogen fuel to the hydrogen delivery assembly comprises starting a liquid pump of the fuel management unit, wherein the liquid pump is configured to generate a flow of the hydrogen fuel in the liquid phase.

The method of any preceding clause, further comprising: directing one or more components to convert the hydrogen fuel from the liquid phase to a gaseous phase using the hydrogen delivery assembly.

The method of any preceding clause, wherein directing one or more components to convert the hydrogen fuel from the liquid phase to a gaseous phase using the hydrogen delivery assembly further comprising heating the hydrogen fuel with the hydrogen delivery assembly.

The method of any preceding clause, further comprising: directing one or more components to provide the converted hydrogen fuel in the gaseous phase to a combustion section.

The method of any preceding clause, wherein directing one or more components to provide the converted hydrogen fuel in the gaseous phase to the combustion section comprises receiving data indicative of the state of the fuel system, the state of the fuel system comprising an operating condition of the fuel system.

The method of any preceding clause, further comprising: determining an amount of the hydrogen fuel in the gaseous phase to provide to the combustion section of the fuel system in response to receiving data indicative of the state of the fuel system.

The method of any preceding clause, wherein directing one or more components to provide the hydrogen fuel in the gaseous phase to the combustion section of the fuel system comprises metering a flow of the hydrogen fuel in the gaseous phase from an outlet of the hydrogen delivery assembly.

The method of any preceding clause, further comprising: directing one or more components to supplement a flow of the hydrogen fuel with an auxiliary flow of hydrogen fuel from an auxiliary hydrogen tank.

The method of any preceding clause, further comprising: accumulating excess hydrogen fuel in an auxiliary hydrogen tank.

A gas turbine engine comprising: a turbomachine comprising a combustion section and an exhaust assembly arranged in serial flow order, the turbomachine further comprising a sensor; a fuel system comprising a hydrogen delivery assembly positioned in thermal communication with the exhaust assembly and in fluid communication with the combustion section; and a controller comprising a non-transitory memory and one or more processors, the non-transitory memory storing instructions that, when executed by the one or more processors, cause the gas turbine engine to perform operations, the operations comprising: receiving data indicative of a state of the exhaust assembly using the sensor of the turbomachine; determining an amount of a hydrogen fuel in a liquid phase to provide to the hydrogen delivery assembly in response to receiving data indicative of the state of the exhaust assembly; and directing one or more components to provide the determined amount of the hydrogen fuel to the hydrogen delivery assembly.

The gas turbine engine of any preceding clause, wherein the operations further comprise: directing one or more components to provide the determined amount of the hydrogen fuel to the hydrogen delivery assembly comprises starting a liquid pump of the fuel management unit, wherein the liquid pump is configured to generate a flow of the hydrogen fuel in the liquid phase.

The gas turbine engine of any preceding clause, wherein the operations further comprise: directing one or more components to convert the hydrogen fuel from the liquid phase to a gaseous phase using the hydrogen delivery assembly comprises heating the hydrogen fuel with the hydrogen delivery.

The gas turbine engine of any preceding clause, wherein directing one or more components to convert the hydrogen fuel from the liquid phase to a gaseous phase using the hydrogen delivery assembly further comprising heating the hydrogen fuel with the hydrogen delivery assembly.

The gas turbine engine of any preceding clause, wherein the operations further comprise: directing one or more components to provide the converted hydrogen fuel in the gaseous phase to a combustion section.

The gas turbine engine of any preceding clause, wherein directing one or more components to provide the converted hydrogen fuel in the gaseous phase to the combustion section comprises receiving data indicative of the state of the fuel system, the state of the fuel system comprising an operating condition of the fuel system.

The gas turbine engine of any preceding clause, wherein the operations further comprise: determining an amount of the hydrogen fuel in the gaseous phase to provide to the combustion section of the fuel system in response to receiving data indicative of the state of the fuel system.

The gas turbine engine of any preceding clause, wherein directing one or more components to provide the hydrogen fuel in the gaseous phase to the combustion section of the fuel system comprises metering a flow of the hydrogen fuel in the gaseous phase from an outlet of the hydrogen delivery assembly.

The gas turbine engine of any preceding clause, wherein the operations further comprise: directing one or more components to supplement a flow of the hydrogen fuel with an auxiliary flow of hydrogen fuel from an auxiliary hydrogen tank.

The gas turbine engine of any preceding clause, wherein the operations further comprise: accumulating excess hydrogen fuel in an auxiliary hydrogen tank.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of operating a fuel management unit for a fuel system, the method comprising:
   receiving data indicative of a state of an exhaust assembly using a sensor of the fuel system, the state of the exhaust assembly comprising a temperature of a working gas flow within the exhaust assembly;
   determining an amount of a hydrogen fuel in a liquid phase to provide to a hydrogen delivery assembly in response to receiving data indicative of the state of the exhaust assembly;
   directing one or more components to provide the determined amount of the hydrogen fuel in the liquid phase to the hydrogen delivery assembly;
   converting, with the hydrogen deliver assembly, the determined amount of hydrogen fuel in the liquid phase to hydrogen fuel in a gaseous phase;
   determining an amount of hydrogen fuel converted to the gaseous phase; and
   comparing the amount of hydrogen fuel converted to the gaseous phase to a desired amount of hydrogen fuel in the gaseous phase.

2. The method of claim 1, wherein directing one or more components to provide the determined amount of the hydrogen fuel in the liquid phase to the hydrogen delivery assembly comprises starting a liquid pump of the fuel management unit, wherein the liquid pump is configured to generate a flow of the hydrogen fuel in the liquid phase.

3. The method of claim 1, wherein, based on the compared amount of hydrogen fuel converted to the gaseous phase to the desired amount of hydrogen fuel in the gaseous phase, it is determined that the amount of hydrogen fuel converted to the gaseous phase is greater than or equal to the desired amount of hydrogen fuel in the gaseous phase.

4. The method of claim 3, wherein, in response to it being determined that the amount of hydrogen fuel converted to the gaseous phase is greater than or equal to the desired amount of hydrogen fuel in the gaseous phase, it is determined that there is excess hydrogen fuel in the gaseous phase, wherein one or more components are directed to provide the desired amount of hydrogen fuel in the gaseous phase to a combustion section, and wherein one or more components are directed to accumulate the excess hydrogen fuel in the gaseous phase in an auxiliary hydrogen fuel tank.

5. The method of claim 3, wherein, in response to it being determined that the amount of hydrogen fuel converted to the gaseous phases is greater than or equal to the desired amount of hydrogen fuel in the gaseous phase, it is determined that there is no excess hydrogen fuel in the gaseous phase, and wherein one or more components are directed to provide the desired amount of hydrogen fuel in the gaseous phase to a combustion section.

6. The method of claim 5, further comprising receiving data indicative of the state of the fuel system, the state of the fuel system comprising an operating condition of the fuel system.

7. The method of claim 5, further comprising metering a flow of the hydrogen fuel in the gaseous phase from an outlet of the hydrogen delivery assembly.

8. The method of claim 1, wherein directing one or more components to convert the hydrogen fuel from the liquid phase to a gaseous phase using the hydrogen delivery assembly further comprising heating the hydrogen fuel with the hydrogen delivery assembly.

9. The method of claim 3, wherein, based on the compared amount of hydrogen fuel converted to the gaseous phase to the desired amount of hydrogen fuel in the gaseous phase, it is determined that the amount of hydrogen fuel converted to the gaseous phase is less than the desired amount of hydrogen fuel in the gaseous phase.

10. The method of claim 9, wherein, in response to it being determined that the amount of hydrogen fuel converted to the gaseous phase is less than the desired amount of hydrogen fuel in the gaseous phase, one or more components are directed to supplement the converted hydrogen fuel in the gaseous phase with a flow of hydrogen fuel from an auxiliary hydrogen fuel tank.

11. A gas turbine engine comprising:
   a turbomachine comprising a combustion section and an exhaust assembly arranged in serial flow order, the turbomachine further comprising a sensor;
   a fuel system comprising a hydrogen delivery assembly positioned in thermal communication with the exhaust assembly and in fluid communication with the combustion section; and
   a controller comprising a non-transitory memory and one or more processors, the non-transitory memory storing instructions that, when executed by the one or more processors, cause the gas turbine engine to perform operations, the operations comprising:
      receiving data indicative of a state of the exhaust assembly using the sensor of the turbomachine;
      determining an amount of a hydrogen fuel in a liquid phase to provide to the hydrogen delivery assembly in response to receiving data indicative of the state of the exhaust assembly; and
      directing one or more components to provide the determined amount of the hydrogen fuel in the liquid phase to the hydrogen delivery assembly;
      converting, with the hydrogen deliver assembly, the determined amount of hydrogen fuel in the liquid phase to hydrogen fuel in a gaseous phase;
      determining an amount of hydrogen fuel converted to the gaseous phase; and
      comparing the amount of hydrogen fuel converted to the gaseous phase to a desired amount of hydrogen fuel in the gaseous phase.

12. The gas turbine engine of claim 11, wherein the operations further comprise:
   directing one or more components to provide the determined amount of the hydrogen fuel in the liquid phase to the hydrogen delivery assembly comprises starting a liquid pump of the fuel management unit, wherein the liquid pump is configured to generate a flow of the hydrogen fuel in the liquid phase.

13. The gas turbine engine of claim 11, wherein, based on the compared amount of hydrogen fuel converted to the gaseous phase to the desired amount of hydrogen fuel in the gaseous phase, it is determined that the amount of hydrogen fuel converted to the gaseous phase is greater than or equal to the desired amount of hydrogen fuel in the gaseous phase.

14. The gas turbine engine of claim 13, wherein, in response to it being determined that the amount of hydrogen fuel converted to the gaseous phase is greater than or equal to the desired amount of hydrogen fuel in the gaseous phase, it is determined that there is excess hydrogen fuel in the gaseous phase, wherein one or more components are directed to provide the desired amount of hydrogen fuel in the gaseous phase to a combustion section, and wherein one or more components are directed to accumulate the excess hydrogen fuel in the gaseous phase in an auxiliary hydrogen fuel tank.

15. The gas turbine engine of claim 13, wherein, in response to it being determined that the amount of hydrogen fuel converted to the gaseous phases is greater than or equal to the desired amount of hydrogen fuel in the gaseous phase, it is determined that there is no excess hydrogen fuel in the gaseous phase, and wherein one or more components are directed to provide the converted hydrogen fuel in the gaseous phase to a combustion.

16. The gas turbine engine of claim 15, further comprising receiving data indicative of the state of the fuel system, the state of the fuel system comprising an operating condition of the fuel system.

17. The gas turbine engine of claim 15, further comprising metering a flow of the hydrogen fuel in the gaseous phase from an outlet of the hydrogen delivery assembly.

18. The gas turbine engine of claim 11, wherein directing one or more components to convert the hydrogen fuel from the liquid phase to a gaseous phase using the hydrogen delivery assembly further comprising heating the hydrogen fuel with the hydrogen delivery assembly.

19. The gas turbine engine of claim 13, wherein, based on the compared amount of hydrogen fuel converted to the gaseous phase to the desired amount of hydrogen fuel in the gaseous phase, it is determined that the amount of hydrogen fuel converted to the gaseous phase is less than the desired amount of hydrogen fuel in the gaseous phase.

20. The gas turbine engine of claim 19, wherein, in response to it being determined that the amount of hydrogen fuel converted to the gaseous phase is less than the desired amount of hydrogen fuel in the gaseous phase, one or more components are directed to supplement the converted hydrogen fuel in the gaseous phase with a flow of hydrogen fuel from an auxiliary hydrogen fuel tank.

* * * * *